(12) United States Patent
Akishita

(10) Patent No.: US 7,177,422 B2
(45) Date of Patent: Feb. 13, 2007

(54) ELLIPTIC CURVE ENCRYPTION PROCESSING METHOD, ELLIPTIC CURVE ENCRYPTION PROCESSING APPARATUS, AND PROGRAM

(75) Inventor: Toru Akishita, Kanagawa (JP)

(73) Assignee: Sony Corporation (JP)

( * ) Notice: Subject to any disclaimer, the term of this patent is extended or adjusted under 35 U.S.C. 154(b) by 741 days.

(21) Appl. No.: 10/128,805

(22) Filed: Apr. 24, 2002

(65) Prior Publication Data

US 2003/0026419 A1    Feb. 6, 2003

(30) Foreign Application Priority Data

Apr. 24, 2001    (JP) ............................ P2001-126024

(51) Int. Cl.
  *H04L 9/00* (2006.01)
  *G06F 7/72* (2006.01)
(52) U.S. Cl. ........................... 380/28; 380/30; 708/492
(58) Field of Classification Search ................ 380/28, 380/30, 37; 708/492; 235/492
  See application file for complete search history.

(56) References Cited

U.S. PATENT DOCUMENTS

| 6,185,596 | B1 * | 2/2001 | Hadad et al. ............... 708/491 |
| 6,240,436 | B1 * | 5/2001 | McGregor .................. 708/491 |
| 6,416,594 | B1 * | 7/2002 | Yamagami et al. .......... 380/59 |
| 6,430,588 | B1 * | 8/2002 | Kobayashi et al. ......... 708/492 |
| 6,480,606 | B1 * | 11/2002 | Kurumatani .................. 380/30 |
| 6,546,104 | B1 * | 4/2003 | Shimbo et al. ............... 380/28 |
| 6,748,410 | B1 * | 6/2004 | Gressel et al. ............. 708/491 |
| 6,782,100 | B1 * | 8/2004 | Vanstone et al. ............. 380/28 |
| 2001/0048741 | A1 * | 12/2001 | Okeya ........................ 380/28 |

OTHER PUBLICATIONS

Okeya, Katsuyuki et al, Elliptic Curves with the Montgomery—Form and their Cryptographic Applications, Springer—Verlag, 2000.*

(Continued)

*Primary Examiner*—Nasser Moazzami
*Assistant Examiner*—Shanto M Z Abedin
(74) *Attorney, Agent, or Firm*—Lerner, David, Littenberg, Krumholz & Mentlik, LLP

(57) ABSTRACT

An elliptic curve encryption processing method and an elliptic curve encryption processing apparatus enable high-speed elliptic curve encryption processing computations to be realized. In elliptic curve encryption processing computations, two scalar multiplications, kP and lQ, are not performed separately, but the computation process of kP+lQ is performed simultaneously. In the computation of scalar multiplications, kP and lQ are set on a Montgomery elliptic curve $By^2=x^3+Ax^2+x$. On the basis of a combination of each bit value of k and l from the high-order bits of the binary representation data of the scalar quantities k and l, a computation relation of the next four points based on the computed four points is selected, and based on the selected relation, a process of computing the next four points is repeatedly performed to eventually compute kP+lQ.

20 Claims, 11 Drawing Sheets

OTHER PUBLICATIONS

Hankerson, Darrel et al, Software Implementation of Elliptic Curve Cryptography over Binary Fields, Springer—Verlag, 2000.*

X9.62-1998 Public Key Cryptography For The Financial Services Industry: The Elliptic Curve Digital Signature Algorithm (ECDSA), pp. 71-86, 1998 American Bankers Association.*

Okeya, Katsuyuki et al, Power Analysis Breaks Elliptic Curve Cryptosystems Even Secure Against The Timing Attack, Springer—Verlag, 2000.*

Julio Lopez et al, Fast multiplication on elliptic curves over GF(2m) without precomputation, 1999.*

Chae Hoon et al, Speeding up elliptic Scalar Multiplication with Precomputation, Lecture Notes in CS, 2000.*

Katsuyuki Okeya et al, Power Analysis Breaks Elliptic Curve Cryptosystems Even Secure Against The Timing Attack, Springer Verlag, 2000.*

"Standard Specifications for Public Key Cryptography", IEEE P1363/D13 (Draft Version 13), pp. 1-73, (1999).

Peter L. Montgomery, "Speeding the Pollard and Elliptic Curve Methods of Factorization", Mathematics of Computation, vol. 48, No. 177, Jan. 1987, pp. 243-264.

J. Lopez et al., "Fast Multiplication on Elliptic Curves over GF ($2^m$) without Precomputation", Cryptographic Hardware and Embedded Systems, LNCS, pp. 316-327 (1999).

* cited by examiner

ELLIPTIC CURVE ENCRYPTION PROCESSING METHOD, ELLIPTIC CURVE ENCRYPTION PROCESSING APPARATUS, AND PROGRAM

CROSS-REFERENCE TO RELATED APPLICATIONS

The present application claims priority from Japanese Application No. 2001-126024 filed Apr. 24, 2001, the disclosure of which is hereby incorporated by reference herein.

BACKGROUND OF THE INVENTION

The present invention relates to an elliptic curve encryption processing method, an elliptic curve encryption processing apparatus, and a program for realizing high-speed elliptic curve encryption.

Recently, with advances in network communication and electronic commerce, security protection in communication has become an important issue. One method of security protection is encryption technology and, at present, communications using various encryption techniques are performed in practice.

The encryption methods are broadly classified into common key methods and public key methods. The common key methods are also called "symmetrical encryption methods", in which both the originator and the receiver hold a common key. As a representative method of the common key method, there is DES (Data Encryption Standard). The features of the DES algorithm are that encryption and decryption can be performed using substantially the same algorithm.

In contrast to this common key encryption, a construction in which the keys of the originator and the receiver are different is a public key method or an asymmetrical encryption method. In the public key encryption method, unlike the common key encryption method which uses a common key for encryption and decryption, a secret key which must be kept secret needs only to be possessed by one specific person. Therefore, the public key encryption method is advantageous in managing keys. However, since the data processing speed of the public key encryption method, is generally slower than that of the common key encryption method, the public key encryption method is often used for objects with a small amount of data, such as the distribution of the secret key or a digital signature. RSA (Rivest-Shamir-Adleman) encryption is a representative example of the public key encryption method. RSA uses a product of two very large prime numbers (for example, 150 digits), and the difficulty of factorizing the product of two large prime numbers (for example, 150 digits) into prime numbers is used.

The public key encryption method has a construction in which a public key can be used for an unspecified number of the general public and in which a method of using a certificate, which certifies whether or not the public key to be distributed is valid, that is, a so-called public key certificate, is often used. For example, a user A generates a public key and secret key pair, sends the generated public key to a certificate authority, and obtains a public key certificate from the certificate authority. The user A makes the public key certificate public. An unspecified user obtains the public key from the public key certificate after undergoing a predetermined procedure, encrypts a document, etc., and sends it to the user A. The user A is a system in which the encrypted document, etc., is decrypted using the secret key. Furthermore, the user A is a system in which a signature is attached to a document, etc., by using the secret key, an unspecified user obtains the public key from the public key certificate after undergoing a predetermined procedure, and the verification of the signature is performed.

The public key certificate is a certificate which is issued by the certificate authority (CA) or the issuer authority (IA) in the public key encryption method, and is also a certificate which is created such that, as a result of a user submitting a user ID, the public key, etc., to the certificate authority, the certificate authority adds information, such as the ID of the certificate authority and the period of validity, and furthermore, the signature of the certificate authority is added.

As the public key encryption method, in addition to the above-described RSA method, discrete logarithm encryption, which uses the difficulty of the discrete logarithm problem in a case where n is a prime number, is known. This discrete logarithm encryption is used for the DSA (Digital Signature Standard), which is a known digital signature standard in the United States. Furthermore, the elliptic curve cryptography (ECC), which was proposed by V. Miller and N. Koblitz, has recently attracted attention due to its security and high speed. Elliptic curve cryptography using a 160-bit key is said to have a strength comparable to a 1024-bit key in RSA.

Generally, elliptic curve cryptography uses an elliptic curve represented by $y^2=x^3+ax+b$ ($4a^3+27b^2 \neq 0$) on a prime field and an elliptic curve represented by $y^2+xy=x^3+ax^2+b$ ($b \neq 0$) on two extension fields. A set in which a point at infinity (O) is added to the points on these curves forms a finite group with respect to addition, and the point at infinity (O) becomes the identity element thereof. Hereafter, addition of points on this finite group is indicated by "+". The addition P+Q of two different points P and Q on this finite group is called "addition of points", and the addition P+P=2P of a point P and a point P is called "double addition of points". Furthermore, the computation for determining the points P+P+ . . . +P=kP, in which the point P is added k times, is called "scalar multiplication of points".

It is known that the scalar multiplication of points can be formed by using addition of points and double addition of points. The addition method of points, the double addition method of points, and the scalar multiplication of points on the affine coordinate system (x, y) and the projective coordinates (X, Y, Z) on an elliptic curve on a prime field and on elliptic curves on two extension fields are described in "IEEE P1363/D13 Standard Specification for Public Key Cryptography".

Furthermore, a method (P. Montgomery, "Speeding the Pollard and Elliptic Curve Method of Factorization", Mathematics of Computation, Vol. 48, No. 177, pp. 243–264 (1987)) of performing at high speed the scalar multiplication of points by using a Montgomery elliptic curve represented by $By^2=x^3+Ax^2+x$ ($(A^2-4)B \neq 0$) on a prime field, which was introduced to perform factorization into prime numbers, has been proposed. Hereafter, this technique is called the "Montgomery method on an elliptic curve on a prime field".

According to this method, in the affine coordinate system, when the addition point of two different points $P_0(x_0, y_0)$ and $P_1(x_1, y_1)$ is denoted as point $P_2=P_1+P_0$, if $P_3(x_3, y_3)=P_1(x_1, y_1)-P_0(x_0, y_0)$ is known, then $x_2$ can be determined on the basis of:

$$x_2=(x_0 x_1-1)^2/(x_3(x_0-x_1)^2)$$

Furthermore, when the point of double addition of the point $P_0(x_0, y_0)$ is denoted as point $P_2(x_2, y_2)=2P_0$, then $x_2$ can be determined on the basis of:

$$x_2=(x_0^2-1)^2/(4x_0(x_2^2+Ax_0+1))$$

In this manner, the addition method of points and the double addition method of points can be formed without using the y coordinate.

Here, in general, since division on a prime field has a higher calculation cost compared to multiplication on a prime field, when conversion into the projective coordinate system (X, Y, Z) is performed while assuming that $x=X/Z$ and $y=Y/Z$, the Montgomery elliptic curve becomes:

$$BY^2Z=X^3+AX^2Z+XZ^2$$

At this time, when the addition point of two different points $P_0(X_0, Y_0, Z_0)$ and $P_1(X_1, Y_1, Z_1)$ is denoted as $P_2(X_2, Y_2, Z_2)=P_1(X_1, Y_1, Z_1)+P_0(X_0, Y_0, Z_0)$, if $P_3(X_3, Y_3, Z_3)=P_1(X_1, Y_1, Z_1)-P_0(X_0, Y_0, Z_0)$ is known, then $(X_2, Z_2)$ can be determined on the basis of:

$$X_2=Z_3((X_0-Z_0)(X_1+Z_1)+(X_0+Z_0)(X_1-Z_1))^2$$

$$Z_2=X_3((X_0-Z_0)(X_1+Z_1)-(X_0+Z_0)(X_1-Z_1))^2$$

Furthermore, when the point of the double addition of the point $P_0(X_0, Y_0, Z_0)$ is denoted as point $P_2(X_2, Y_2, Z_2)=2P_0$, then, assuming that $C=(A+2)/4$, $(X_2, Z_2)$ can be determined on the basis of:

$$X_2=(X_0+Z_0)^2$$

$$Z_2=((X_0+Z_0)^2-(X_0-Z_0)^2)((X_0-Z_0)^2+C((X_0+Z_0)^2-(X_0-Z_0)^2))$$

In this manner, the addition method of points and the double addition method of points can be formed without using the Y coordinate.

In order to form a scalar multiplication kP of points by using the above addition method of points and the double addition method of points in the Montgomery elliptic curve on a prime field, a point which is a difference between two points in the addition of points needs to be known. By taking note of this, the following is performed. The initial two points are denoted as {T0, T1}={P, 2P}, and k is subjected to dyadic expansion. When the bits from the bit next to the highest-order bit to the lowest-order are all 0, {2T0, T0+T1} is determined from {T0, T1} so as to be formed as a new {T0, T1}. When the bits are all 1, {T0+T1, 2T1} is determined from {T0, T1} so as to be formed as a new {T0, T1}. This is repeated. Then, the final T0 becomes kP. At this time, T1−T0=P always holds.

ECDSA (Elliptic Curve Digital Signature Algorithm) is a representative example of an electronic signature method using elliptic curve encryption. In the signature verification process of ECDSA, a calculation for determining the x coordinate of the addition point kP+lQ of scalar multiplication points of two different points is required.

In order to calculate the x coordinate of kP+lQ using the Montgomery method on an elliptic curve on a prime field, the following is performed. First, kP and lQ are determined by the Montgomery method on an elliptic curve on a prime field in accordance with the above-described technique. Thereafter, the point kP and the point lQ are added together. However, since the point of the difference between two points is not known, the above-described addition method of points cannot be used. For this reason, it is necessary to determine the x coordinate of kP+lQ by using another addition method after the y coordinate or the Y coordinate of each of kP and lQ is recovered.

Furthermore, a technique (J. Lopez and R. Dahab, "Fast Multiplication on Elliptic Curve over $GF(2^m)$ without Pre-computation", Cryptographic Hardware and Embedded Systems, LNCS 1717, pp. 316–327 (1999)) of performing at high speed the scalar multiplication of points by the same technique as for the Montgomery elliptic curve on a prime field on an elliptic curve $y^2+xy=x^3+ax^2+b$ ($b\neq 0$) on two extension fields has been proposed. Hereafter, this is called the "Montgomery method on elliptic curves on two extension fields". Also, in this technique, in order to calculate the x coordinate of kP+lQ, it is necessary to determine the x coordinate of kP+lQ after the y coordinate or the Y coordinate of each of kP and lQ is recovered.

As described above, in the Montgomery method on an elliptic curve on a prime field and in the Montgomery method on elliptic curves on two extension fields, scalar multiplication of points can be calculated at high speed. However, in the calculation of kP+lQ required when the ECDSA signature is to be created, a process of restoring the y coordinate or the Y coordinate of kP+lQ is required.

SUMMARY OF THE INVENTION

The present invention has been made in view of the above-described problems with using the Montgomery method on an elliptic curve on a prime field and the Montgomery method on elliptic curves on two extension fields. An object of the present invention is to provide an elliptic curve encryption processing method, an elliptic curve encryption processing apparatus, and a recording medium recorded with a program in which a high-speed elliptic curve encryption process is realized by simultaneously performing the computation process of kP+lQ while calculating four points on an elliptic curve without separately performing two scalar multiplications kP and lQ.

Another object of the present invention is to provide an elliptic curve encryption processing method, an elliptic curve encryption processing apparatus, and a recording medium recorded with a program in which a high-speed elliptic curve encryption process is realized by simultaneously performing the computation process of kP+lQ while calculating three points on an elliptic curve when the computation process of kP and lQ is performed.

To achieve the above-mentioned objects, in a first aspect, the present invention provides an elliptic curve encryption processing method using a Montgomery elliptic curve $By^2=x^3+Ax^2+x$ on a prime field, the elliptic curve encryption processing method including, in the computation of an addition point kP+lQ of a point kP which is a scalar quantity k times as great as a point P on the Montgomery elliptic curve and of a point lQ which is a scalar quantity l times as great as a point Q on the Montgomery elliptic curve, an initial point computation step of calculating a set $G_{t+1}$ of four initial points on the basis of the point P and the point Q; a bit value detection step of detecting a combination of each bit value of k and l of binary representation data of the scalar quantities k and l; and an iterative computation process step of selecting a computation relation of a set $G_t$ of the next four points based on the set Gt+1 of four initial points according to a combination of each bit value of the binary representation data of k and l detected in the bit value detection step and performing a computation process of the next four points in accordance with the computation relation of the set $G_t$, and selecting a computation relation of a set $G_i$ of the next four points based on a set $G_{i+1}$ of the four computed points and repeatedly performing a computation process of the next four points according to the number of bits of k or l of the binary representation data in accordance with the computation relation of the set $G_i$.

In one form of the elliptic curve encryption processing method of the present invention, when the high-order bit values of the high orders t to i when each bit of the binary representation data of k and l are k: $(k_t \ldots k_o)_2$ and l: $(l_t \ldots l_o)_2$ are $m_i=(k_t \ldots k_i)_2$ and $ni=(l_t \ldots l_i)_2$, the set $G_i$ of four points is formed of the four points which are indicated in the expressions below by using the point P and the point Q:

$m_i P + n_i Q$ $m_i P + (n_i+1) Q$ $(m_i+1) P + n_i Q$ $(m_i+1) P + (n_i+1) Q$, and the initial points are set as the four points shown below which are computed on the basis of the expressions on the basis of $m_{t+1}=k_{t+1}=0$ and $n_{t+1}=l_{t+1}=0$ by setting i=t+1:

$T_0[t+1]=O$ (point at infinity)

$T_1[t+1]=Q$ $T_2[t+1]=P$ $T_3[t+1]=P+Q$.

Furthermore, in another form of the elliptic curve encryption processing method of the present invention, when the high-order bit values of the high orders t to i when each bit of the binary representation data of k and l is k: $(k_t \ldots k_o)_2$ and l: $(l_t \ldots l_o)_2$ are $m_i=(k_t \ldots k_i)_2$ and $n_i=(l_t \ldots l_i)_2$, the set $G_i$ of four points is formed of the four points which are indicated in the expressions below by using the point P and the point Q:

$m_i P + n_i Q$ $m_i P + (n_i+1) Q$ $(m_i+1) P + n_i Q$ $(m_i+1) P + (n_i+1) Q$, and the iterative computation process step includes computing the set $G_i$ of the next four points repeatedly on the basis of the set $G_{i+1}$ of the four computed points in order to eventually compute a set $G_0$ of four points, and in which one point which is a constituent of the set $G_0$ of four points is computed as W=kP+lQ.

In a second aspect, the present invention provides an elliptic curve encryption processing method using a Montgomery elliptic curve $By^2=x^3+Ax^2+x$ on a prime field, the elliptic curve encryption processing method including, in the computation of an addition point kP+lQ of a point kP which is a scalar quantity k times as great as a point P on the Montgomery elliptic curve and of a point lQ which is a scalar quantity l times as great as a point Q on the Montgomery elliptic curve, a bit value detection step of detecting a combination of each bit value of k and l of binary representation data of the scalar quantities k and l; an initial point computation step of computing a set $G'_{t+1}$ of three initial points on the basis of a combination of the highest-order bit value $(k_t, l_t)$ of k and l of the binary representation data of the scalar quantities k and l; and an iterative computation process step of selecting a computation relation of a set $G'_i$ of the next three points based on the set $G'_{i+1}$ of three initial points according to a combination of each bit value of the binary representation data of k and l detected in the bit value detection step and performing a computation process of the next three points in accordance with the computation relation of the set $G'_i$, and selecting a computation relation of a set $G'_i$ of the next three points based on a set $G'_{i+1}$ of the three computed points and repeatedly performing a computation process of the next three points according to the number of bits of k or l of the binary representation data in accordance with the computation relation of the set $G'_i$.

In one form of the elliptic curve encryption processing method of the present invention, when the high-order bit values of the high orders t to i when each bit of the binary representation data of k and l are k: $(k_t \ldots k_o)_2$ and l: $(l_t \ldots l_o)_2$ are $m_i=(k_t \ldots k_i)_2$ and $n_i=(l_t \ldots l_i)_2$, the set $G'_i$ of three points is formed of the three points which are selected on the basis of a combination of the bit value $(k_{t-1}, l_{t-1})$ of k and l of the binary representation data from the following four points indicated in the expression below by using the point P and the point Q:

$m_i P + n_i Q$ $m_i P + (n_i+1) Q$ $(m_i+1) P + n_i Q$ $(m_i+1) P + (n_i+1) Q$, and the initial points are set as the three points which are selected on the basis of a combination of the highest-order bit value $(k_t, l_t)$ of k and l of the binary representation data from the following four points:

$T_0[t+1]=O$ (point at infinity)

$T_1[t+1]=Q$ $T_2[t+1]=P$ $T_3[t+1]=P+A$ which are the four points computed based on the above relations from $m_{t+1}=k_{t+1}=0$ and $n_{t+1}=l_{t+1}=0$ by setting i=t+1.

In another form of the elliptic curve encryption processing method of the present invention, when the high-order bit values of the high orders t to i when each bit of the binary representation data of k and l are k: $(k_t \ldots k_o)_2$ and l: $(l_t \ldots l_o)_2$ are $m_i=(k_t \ldots k_i)_2$ and $n_i=(l_t \ldots l_i)_2$, the set $G'_i$ of three points is formed of the three points which are selected on the basis of a combination of the high-order bit value $(k_t, l_t)$ of k and l of the binary representation data indicated in the expressions below by using the point P and the point Q:

$m_i P + n_i Q$ $m_i P + (n_i+1) Q$ $(m_i+1) P + n_i Q$ $(m_i+1) P + (n_i+1) Q$, and the iterative computation process step includes computing the set $G'_i$ of the next three points from the set $G'_{i+1}$ of the three computed points repeatedly to eventually compute a set $G'_{i+1}$ of three points, and W=kP+lQ is computed from the set $G'_1$ of three points.

In a third aspect, the present invention provides an elliptic curve encryption processing method using an elliptic curve $y^2+xy=x^3+ax^2+b$ on two extension fields, the elliptic curve encryption processing method including, in the computation of an addition point $kP+lQ$ of a point $kP$ which is a scalar quantity k times as great as a point P on the elliptic curve and of a point $lQ$ which is a scalar quantity l times as great as a point Q on the elliptic curve, an initial point computation step of calculating a set $G_{t+1}$ of four initial points on the basis of the point P and the point Q; a bit value detection step of detecting a combination of each bit value of k and l of binary representation data of the scalar quantities k and l; and an iterative computation process step of selecting a computation relation of a set Gt of the next four points based on the set $G_{t+1}$ of four initial points according to a combination of each bit value of the binary representation data of k and l detected in the bit value detection step and performing a computation process of the next four points in accordance with the computation relation of the set $G_t$, and selecting a computation relation of a set $G_i$ of the next four points based on a set $G_{i+1}$ of the four computed points and repeatedly performing a computation process of the next four points according to the number of bits of k or l of the binary representation data in accordance with the computation relation of the set $G_i$.

In one form of the elliptic curve encryption processing method of the present invention, when the high-order bit values of the high orders t to i when each bit of the binary representation data of k and l are k: $(k_t \ldots k_o)_2$ and l: $(l_t \ldots l_o)_2$ are $m_i=(k_t \ldots k_i)_2$ and $n_i=(l_t \ldots l_i)_2$, the set $G_i$ of four points is formed of the four points which are indicated in the expressions below by using the point P and the point Q:

$m_iP+n_iQ$ $m_iP+(n_i+1)Q$ $(m_i+1)P+n_iQ$ $(m_i+1)P+(n_i+1)Q$, and the initial points are set as the four points shown below which are computed on the basis of the expressions on the basis of $m_{t+1}=k_{t+1}=0$ and $n_{t+1}=l_{t+1}=0$ by setting $i=t+1$:

$T_0[t+1]=O$ (point at infinity)

$T_1[t+1]=Q$ $T_2[t+1]=P$ $T_3[t+1]=P+Q$.

In another form of the elliptic curve encryption processing method of the present invention, when the high-order bit values of the high orders t to i when each bit of the binary representation data of k and l is k: $(k_t \ldots k_o)_2$ and l: $(l_t \ldots l_o)_2$ are $m_i=(k_t \ldots k_i)_2$ and $n_i=(l_t \ldots l_i)_2$, the set $G_i$ of four points is formed of the four points which are indicated in the expressions below by using the point P and the point Q:

$m_iP+n_iQ$ $m_iP+(n_i+1)Q$ $(m_i+1)P+n_iQ$ $(m_i+1)P+(n_i+1)Q$, and the iterative computation process step includes computing the set $G_i$ of the next four points repeatedly on the basis of the set $G_{i+1}$ of the four computed points in order to eventually compute a set $G_0$ of four points, and in which one point which is a constituent of the set $G_0$ of four points is computed as $W=kP+lQ$.

In a fourth aspect, the present invention provides an elliptic curve encryption processing method using an elliptic curve $y^2+xy=X^3+aX^2+b$ on two extension fields, the elliptic curve encryption processing method including, in the computation of an addition point $kP+lQ$ of a point $kP$ which is a scalar quantity k times as great as a point P on the elliptic curve and of a point $lQ$ which is a scalar quantity l times as great as a point Q on the elliptic curve, a bit value detection step of detecting a combination of each bit value of k and l of binary representation data of the scalar quantities k and l; an initial point computation step of computing a set $G'_{t+1}$ of three initial points on the basis of a combination of the highest-order bit value $(k_t, l_t)$ of k and l of the binary representation data of the scalar quantities k and l by using the point P and the point Q; and an iterative computation process step of selecting a computation relation of a set $G'_t$ of the next three points based on the set $G'_{t+1}$ of three initial points according to a combination of each bit value of the binary representation data of k and l detected in the bit value detection step and performing a computation process of the next three points in accordance with the computation relation of the set $G'_t$, and selecting a computation relation of a set $G'_i$ of the next three points based on a set $G'_{i+1}$ of the three computed points and repeatedly performing a computation process of the next three points according to the number of bits of k or l of the binary representation data in accordance with the computation relation of the set $G'_i$.

In one form of the elliptic curve encryption processing method of the present invention, when the high-order bit values of the high orders t to i when each bit of the binary representation data of k and l are k: $(k_t \ldots k_o)_2$ and l: $(l_t \ldots l_o)_2$ are $m_i=(k_t \ldots k_i)_2$ and $n_i=(l_t \ldots l_i)_2$, the set $G'_i$ of three points is formed of the three points which are selected on the basis of a combination of the bit values $(k_{i-1}, l_{i-1})$ of k and l of the binary representation data from the four points indicated in the expressions below by using the point P and the point Q:

$m_iP+n_iQ$ $m_iP+(n_i+1)Q$ $(m_i+1) P+n_iQ$ $(m_i+1)P+(n_i+1)Q$, and the initial points are set as the three points which are selected on the basis of a combination of the highest-order bit value $(k_t, l_t)$ of k and l of the binary representation data from the four points shown below which are computed on the basis of the above expressions on the basis of $m_{t+1}=k_{t+1}=0$ and $n_{t+1}=l_{t+1}=0$ by setting $i=t+1$:

$T_0[t+1]=O$ (point at infinity)

$T_0[t+1]=Q$ $T_2[t+1]=P$ $T_3[t+1]=P+Q$.

In another form of the elliptic curve encryption processing method of the present invention, when the high-order bit values of the high orders t to i when each bit of the binary representation data of k and l is k: $(k_t \ldots k_o)_2$ and l: $(l_t \ldots l_o)_2$ are $m_i=(k_t \ldots k_i)_2$ and $n_i=(l_t \ldots l_i)_2$, the set $G'_i$ of three points is formed of the three points which are selected on the basis of a combination of the bit values $(k_{i-1}, l_{i-1})$ of k and l of the binary representation data from the four points indicated in the expressions below by using the point P and the point Q:

$m_i P + n_i Q$ $m_i P + (n_i+1) Q$ $(m_i+1) P + n_i Q$ $(m_i+1) P + (n_i+1) Q$, and the iterative computation process step includes computing the set $G'_i$ of the next three points on the basis of the set $G'_{i+1}$ of the three computed points repeatedly to eventually compute a set $G'_1$ of three points, and in which $W = kP + lQ$ is computed from the set $G'_1$ of three points.

In a fifth aspect, the present invention provides an elliptic curve encryption processing apparatus using a Montgomery elliptic curve $By^2 = x^3 + Ax^2 + x$ on a prime field, the elliptic curve encryption processing apparatus including a computation processor operable to compute an addition point $kP + lQ$ of a point $kP$ which is a scalar quantity k times as great as a point P on the Montgomery elliptic curve and of a point $lQ$ which is a scalar quantity l times as great as a point Q on the Montgomery elliptic curve, wherein the computation processor performs: an initial point computation process of calculating a set $G_{t+1}$ of four initial points on the basis of the point P and the point Q; a bit value detection process of detecting a combination of each bit value of k and l of binary representation data of the scalar quantities k and l; and an iterative computation process of selecting a computation relation of a set $G_t$ of the next four points based on the set $G_{t+1}$ of four initial points according to a combination of each bit value of the binary representation data of k and l detected in the bit value detection process and performing a computation process of the next four points in accordance with the computation relation of the set $G_t$, and selecting a computation relation of a set $G_i$ of the next four points based on a set $G_{i+1}$ of the four computed points and repeatedly performing a computation process of the next four points according to the number of bits of k or l of the binary representation data in accordance with the computation relation of the set $G_i$.

In one form of the elliptic curve encryption processing apparatus of the present invention, when the high-order bit values of the high orders t to i when each bit of the binary representation data of k and l are k: $(k_t \ldots k_o)_2$ and l: $(l_t \ldots l_o)_2$ are $m_i = (k_t \ldots k_i)_2$ and $n_i = (l_t \ldots l_i)_2$, the set $G'_i$ of four points is formed of the four points which are indicated in the expressions below by using the point P and the point Q:

$m_i P + n_i Q$ $m_i P + (n_i+1) Q$ $(m_i+1) P + n_i Q$ $(m_i+1) P + (n_i+1) Q$, and the initial points are set as the four points shown below which are computed on the basis of the expressions on the basis of $m_{t+1} = k_{t+1} = 0$ and $n_{t+1} = l_{t+1} = 0$ by setting $i = t+1$:

$T_0[t+1] = O$ (point at infinity)

$T_1[t+1] = Q$ $T_2[t+1] = P$ $T_3[t+1] = P + Q$.

In another form of the elliptic curve encryption processing apparatus of the present invention, when the high-order bit values of the high orders t to i when each bit of the binary representation data of k and l is k: $(k_t \ldots k_o)_2$ and l: $(l_t \ldots l_o)_2$ are $m_i = (k_t \ldots k_i)_2$ and $n_i = (l_t \ldots l_i)_2$, the set $G'_i$ of four points is formed of the four points which are indicated in the expressions below by using the point P and the point Q:

$m_i P + n_i Q$ $m_i P + (n_i+1) Q$ $(m_i+1) P + n_i Q$ $(m_i+1) P + (n_i+1) Q$, and the computation processor is operable to compute the set $G_i$ of the next four points repeatedly on the basis of the set $G_{i+1}$ of the four computed points in order to eventually compute a set $G_0$ of four points, and in which one point which is a constituent of the set $G_0$ of four points is computed as $W = kP + lQ$.

In a sixth aspect, the present invention provides an elliptic curve encryption processing apparatus using a Montgomery elliptic curve $By^2 = X^3 + Ax^2 + x$ on a prime field, the elliptic curve encryption processing apparatus including a computation processor operable to compute an addition point $kP + lQ$ of a point $kP$ which is a scalar quantity k times as great as a point P on the Montgomery elliptic curve and of a point $lQ$ which is a scalar quantity l times as great as a point Q on the Montgomery elliptic curve, wherein the computation processor performs: a bit value detection process of detecting a combination of each bit value of k and l of binary representation data of the scalar quantities k and l; an initial point computation process of computing a set $G'_{t+1}$ of three initial points on the basis of a combination of the highest-order bit value $(k_t, l_t)$ of k and l of the binary representation data of the scalar quantities k and l; and an iterative computation process of selecting a computation relation of a set $G'_t$ of the next three points based on the set $G'_{t+1}$ of three initial points according to a combination of each bit value of the binary representation data of k and l detected in the bit value detection process and performing a computation process of the next three points in accordance with the computation relation of the set $G'_t$, and selecting a computation relation of a set $G'_i$ of the next three points based on a set $G'_{i+1}$ of the three computed points and repeatedly performing a computation process of the next three points according to the number of bits of k or l of the binary representation data in accordance with the computation relation of the set $G'_i$.

In one form of the elliptic curve encryption processing apparatus of the present invention, when the high-order bit values of the high orders t to i when each bit of the binary representation data of k and l are k: $(k_t \ldots k_o)_2$ and l: $(l_t \ldots l_o)_2$ are $m_i = (k_t \ldots k_i)_2$ and $n_i = (l_t \ldots l_i)_2$, the set $G'_i$ of three points is formed of the three points which are selected on the basis of a combination of the bit value $(k_{t-1}, l_{t-1})$ of k and l of the binary representation data from the following four points indicated in the expression below by using the point P and the point Q:

$m_i P + ni Q$ $m_i P + (ni+1) Q$ $(m_i+1)P+n_iQ$ $(m_i+1)P+(n_i+1)Q$, and the initial points are set as the three points which are selected on the basis of a combination of the highest-order bit value $(k_t, l_t)$ of k and l of the binary representation data from the following four points:

$T_0[t+1]=O$ (point at infinity)

$T_1[t+1]=Q$ $T_2[t+1]=P$ $T_3[t+1]=P+A$ which are the four points computed based on the above relations from $m_{t+1}=k_{t+1}=0$ and $n_{t+1}=l_{t+1}=0$ by setting i=t+1.

In another form of the elliptic curve encryption processing apparatus of the present invention, when the high-order bit values of the high orders t to i when each bit of the binary representation data of k and l are k: $(k_t \ldots k_o)_2$ and l: $(l_t \ldots l_o)_2$ are $m_i=(k_t \ldots k_i)_2$ and $ni=(l_t \ldots l_i)_2$, the set $G'_i$ of three points is formed of the three points which are selected on the basis of a combination of the high-order bit value $(k_t, l_t)$ of k and l of the binary representation data indicated in the expressions below by using the point P and the point Q:

$m_iP+n_iQ$ $m_iP+(n_i+1)Q$ $(m_i+1)P+n_iQ$ $(m_i+1)P+(n_i+1)Q$, and the computation processor is operable to compute the set $G'_i$ of the next three points from the set $G'_{i+1}$ of the three computed points repeatedly to eventually compute a set $G'_1$ of three points, and in which W=kP+lQ is computed from the set $G'_1$ of three points.

In a seventh aspect, the present invention provides an elliptic curve encryption processing apparatus using an elliptic curve $y^2+xy=x^3+ax^2+b$ on two extension fields, the elliptic curve encryption processing apparatus including a computation processor operable to compute an addition point kP+lQ of a point kP which is a scalar quantity k times as great as a point P on the elliptic curve and of a point lQ which is a scalar quantity l times as great as a point Q on the elliptic curve, wherein the computation processor performs: an initial point computation process of calculating a set $G_{t+1}$ of four initial points on the basis of the point P and the point Q; a bit value detection process of detecting a combination of each bit value of k and l of binary representation data of the scalar quantities k and l; and an iterative computation process of selecting a computation relation of a set $G_t$ of the next four points based on the set $G_{t+1}$ of four initial points according to a combination of each bit value of the binary representation data of k and l detected in the bit value detection process and performing a computation process of the next four points in accordance with the computation relation of the set Gt, and selecting a computation relation of a set $G_i$ of the next four points based on a set $G_{i+1}$ of the four computed points and repeatedly performing a computation process of the next four points according to the number of bits of k or l of the binary representation data in accordance with the computation relation of the set $G_i$.

In one form of the elliptic curve encryption processing apparatus of the present invention, when the high-order bit values of the high orders t to i when each bit of the binary representation data of k and l are k: $(k_t \ldots k_o)_2$ and l: $(l_t \ldots l_o)_2$ are $m_i=(k_t \ldots k_i)_2$ and $n_i=(l_t \ldots l_i)_2$, the set $G_i$ of four points is formed of the four points which are indicated in the expressions below by using the point P and the point Q:

$m_iP+n_iQ$ $m_iP+(n_i+1)Q$ $(m_i+1)P+n_iQ$ $(m_i+1)P+(n_i+1)Q$, and the initial points are set as the four points shown below which are computed on the basis of the expressions on the basis of $m_{t+1}=k_{t+1}=0$ and $n_{t+1}=l_{t+1}=0$ by setting i=t+1:

$T_0[t+1]=O$ (point at infinity)

$T_1[t+1]=Q$ $T_2[t+1]=P$ $T_3[t+1]=P+Q$.

In another form of the elliptic curve encryption processing apparatus of the present invention, when the high-order bit values of the high orders t to i when each bit of the binary representation data of k and l is k: $(k_t \ldots k_o)_2$ and l: $(l_t \ldots .l_o)_2$ are $m_i=(k_t \ldots k_i)_2$ and $n_i=(l_t \ldots l_i)_2$, the set $G_i$ of four points is formed of the four points which are indicated in the expressions below by using the point P and the point Q:

$m_iP+n_iQ$ $m_iP+(n_i+1)Q$ $(m_i+1)P+n_iQ$ $(m_i+1)P+(n_i+1)Q$, and the computation processor is operable to compute the set $G_i$ of the next four points repeatedly on the basis of the set $G_{i+1}$ of the four computed points in order to eventually compute a set $G_0$ of four points, and in which one point which is a constituent of the set Go of four points is computed as W=kP+lQ.

In an eighth aspect, the present invention provides an elliptic curve encryption processing apparatus using an elliptic curve $y^2+xy=x^3+ax^2+b$ on two extension fields, the elliptic curve encryption processing apparatus including a computation processor operable to compute an addition point kP+lQ of a point kP which is a scalar quantity k times as great as a point P on the elliptic curve and of a point lQ which is a scalar quantity l times as great as a point Q on the elliptic curve, wherein the computation processor performs: a bit value detection process of detecting a combination of each bit value of k and l of binary representation data of the scalar quantities k and l; an initial point computation process of computing a set $G'_{t+1}$ of three initial points on the basis of a combination of the highest-order bit value $(k_t, l_t)$ of k and l of the binary representation data of the scalar quantities k and l by using the point P and the point Q; and an iterative computation process of selecting a computation relation of a set $G'_t$ of the next three points based on the set $G'_{t+1}$ of three initial points according to a combination of each bit value of the binary representation data of k and l detected in the bit value detection process and performing a computation process of the next three points in accordance with the computation relation of the set $G'_t$, and selecting a computation relation of a set $G'_i$ of the next three points based on a set $G'_{i+1}$ of the three computed points and repeatedly performing a computation process of the next three points according to the number of bits of k or l of the binary representation data in accordance with the computation relation of the set $G'_i$.

In one form of the elliptic curve encryption processing apparatus of the present invention, when the high-order bit values of the high orders t to i when each bit of the binary representation data of k and l are k: $(k_t \ldots k_o)_2$ and l: $(l_t \ldots l_o)_2$ are $m_i = (k_t \ldots k_i)_2$ and $n_i = (l_t \ldots l_i)_2$, the set $G'_i$ of three points is formed of the three points which are selected on the basis of a combination of the bit values $(k_{i-1}, l_{i-1})$ of k and l of the binary representation data from the four points indicated in the expressions below by using the point P and the point Q:

$m_i P + n_i Q$ $m_i P + (n_i+1) Q$ $(m_i+1) P + n_i Q$ $(m_i+1) P + (n_i+1) Q$, and the initial points are set as the three points which are selected on the basis of a combination of the highest-order bit value $(k_t, l_t)$ of k and l of the binary representation data from the four points shown below which are computed on the basis of the above expressions on the basis of $m_{t+1} = k_{t+1} = 0$ and $n_{t+1} = l_{t+1} = 0$ by setting $i = t+1$:

$T_0[t+1] = O$ (point at infinity)

$T_1[t+1] = Q$ $T_2[t+1] = P$ $T_3[t+1] = P+Q$.

In another form of the elliptic curve encryption processing apparatus of the present invention, when the high-order bit values of the high orders t to i when each bit of the binary representation data of k and l is k: $(k_t \ldots k_o)_2$ and l: $(l_t \ldots l_o)_2$ are $m_i = (k_t \ldots k_i)_2$ and $n_i = (l_t \ldots l_i)_2$, the set $G'_i$ of three points is formed of the three points which are selected on the basis of a combination of the bit values $(k_{i-1}, l_{i-1})$ of k and l of the binary representation data from the four points indicated in the expressions below by using the point P and the point Q:

$m_i P + n_i Q$ $m_i P + (n_i+1) Q$ $(m_i+1) P + n_i Q$ $(m_i+1) P + (n_i+1) Q$, and the computation processor is operable to compute the set $G'_i$ of the next three points on the basis of the set $G'_{i+1}$ of the three computed points repeatedly to eventually compute a set $G'_1$ of three points, and in which $W = kP + lQ$ is computed from the set $G'_1$ of three points.

In a ninth aspect, the present invention provides a recording medium recorded with a program for executing, on a computer system, an elliptic curve encryption process using a Montgomery elliptic curve $By^2 = x^3 + Ax^2 + x$ on a prime field in which is computed an addition point $kP + lQ$ of a point kP which is a scalar quantity k times as great as a point P on the Montgomery elliptic curve and of a point lQ which is a scalar quantity l times as great as a point Q on the Montgomery elliptic curve, the program including an initial point computation step of calculating a set $G_{t+1}$ of four initial points on the basis of the point P and the point Q; a bit value detection step of detecting a combination of each bit value of k and l of binary representation data of the scalar quantities k and l; and an iterative computation process step of selecting a computation relation of a set $G_t$ of the next four points based on the set $G_{t+1}$ of four initial points according to a combination of each bit value of the binary representation data of k and l detected in the bit value detection step and performing a computation process of the next four points in accordance with the computation relation of the set $G_t$, and selecting a computation relation of a set $G_i$ of the next four points based on a set $G_{i+1}$ of the four computed points and repeatedly performing a computation process of the next four points according to the number of bits of k or l of the binary representation data in accordance with the computation relation of the set $G_i$.

In a tenth aspect, the present invention provides a recording medium recorded with a program for executing, on a computer system, an elliptic curve encryption process using a Montgomery elliptic curve $By^2 = x^3 + Ax^2 + x$ on a prime field in which is computed an addition point $kP + lQ$ of a point kP which is a scalar quantity k times as great as a point P on the Montgomery elliptic curve and of a point lQ which is a scalar quantity l times as great as a point Q on the Montgomery elliptic curve, the program including a bit value detection step of detecting a combination of each bit value of k and l of binary representation data of the scalar quantities k and l; an initial point computation step of computing a set $G'_{t+1}$ of three initial points on the basis of a combination of the highest-order bit value $(k_t, l_t)$ of k and l of the binary representation data of the scalar quantities k and l; and an iterative computation process step of selecting a computation relation of a set $G'_t$ of the next three points based on the set $G'_{t+1}$ of three initial points according to a combination of each bit value of the binary representation data of k and l detected in the bit value detection step and performing a computation process of the next three points in accordance with the computation relation of the set $G'_t$, and selecting a computation relation of a set $G'_i$ of the next three points based on a set $G'_{i+1}$ of the three computed points and repeatedly performing a computation process of the next three points according to the number of bits of k or l of the binary representation data in accordance with the computation relation of the set $G'_i$.

In an eleventh aspect, the present invention provides a recording medium recorded with a program for executing, on a computer system, an elliptic curve encryption process using an elliptic curve $y^2 + xy = x^3 + ax^2 + b$ on two extension fields in which is computed an addition point $kP + lQ$ of a point kP which is a scalar quantity k times as great as a point P on the elliptic curve and of a point lQ which is a scalar quantity l times as great as a point Q on the elliptic curve, the program including an initial point computation step of calculating a set $G_{t+1}$ of four initial points on the basis of the point P and the point Q; a bit value detection step of detecting a combination of each bit value of k and l of binary representation data of the scalar quantities k and l; and an iterative computation process step of selecting a computation relation of a set $G_t$ of the next four points based on the set $G_{t+1}$ of four initial points according to a combination of each bit value of the binary representation data of k and l detected in the bit value detection step and performing a computation process of the next four points in accordance with the computation relation of the set $G_t$, and selecting a computation relation of a set $G_i$ of the next four points based on a set $G_{i+1}$ of the four computed points and repeatedly performing a computation process of the next four points according to the number of bits of k or l of the binary representation data in accordance with the computation relation of the set $G_i$.

In a twelfth aspect, the present invention provides a recording medium recorded with a program for executing, on a computer system, an elliptic curve encryption process using an elliptic curve $y^2+Xy=X^3+ax^2+b$ on two extension fields in which is computed an addition point kP+lQ of a point kP which is a scalar quantity k times as great as a point P on the elliptic curve and of a point lQ which is a scalar quantity l times as great as a point Q on the elliptic curve, the program including a bit value detection step of detecting a combination of each bit value of k and l of binary representation data of the scalar quantities k and l; an initial point computation step of computing a set $G'_{i+1}$ of three initial points on the basis of a combination of the highest-order bit value ($k_t$, $l_t$) of k and l of the binary representation data of the scalar quantities k and l by using the point P and the point Q; and an iterative computation process step of selecting a computation relation of a set $G'_i$ of the next three points based on the set $G'_{i+1}$ of three initial points according to a combination of each bit value of the binary representation data of k and l detected in the bit value detection step and performing a computation process of the next three points in accordance with the computation relation of the set $G'_i$, and selecting a computation relation of a set $G'_i$ of the next three points based on a set $G'_{i+1}$ of the three computed points and repeatedly performing a computation process of the next three points according to the number of bits of k or l of the binary representation data in accordance with the computation relation of the set $G'_i$.

The recording medium of the present invention is, for example, a storage medium or a communication medium which is provided in a computer-readable form to a general-purpose computer system which can execute various programs.

As a result of providing such a program in a computer-readable form, a process corresponding to the program is performed on the computer system. As a result of installing a computer program in the computer system, cooperative operation is exhibited on the computer system, and an operation/working-effect which is the same as that of the other aspects of the present invention can be obtained.

As has thus been described, according to the elliptic curve encryption processing apparatus, the elliptic curve encryption processing method, and the recording medium recorded with the program of the present invention, high-speed scalar multiplication becomes possible on a Montgomery elliptic curve on a prime field or on elliptic curves on two extension fields.

Furthermore, according to the elliptic curve encryption processing apparatus, the elliptic curve encryption processing method, and the recording medium recorded with the program of the present invention, for example, two scalar multiplications kP and lQ are not performed separately, but the computation process of kP+lQ is performed simultaneously on an elliptic curve on a prime body or on elliptic curves on two extension fields, thereby realizing higher speed. That is, by using a process in which, for initial points, four points or three points are set, and a set $G_i$ of four points is computed from a set $G_{i+1}$ of the four computed points in sequence, or a set $G'_i$ of three points is computed from a set $G'_{i+1}$ of the three computed points in sequence according to the binary data ($k_i$, $l_i$, $k_{i-1}$ $l_{i-1}$) of k or l, high-speed scalar multiplication processing is possible. Furthermore, since there is no need to recover the y or Y coordinate, further improved high-speed processing is possible.

In addition, according to a method of sequentially computing a set $G'_i$ of three points in the elliptic curve encryption processing apparatus, the elliptic curve encryption processing method, and the recording medium recorded with the program of the present invention, the speed can be increased by ¾ times, namely, by 25%, compared to the scalar multiplication kP+lQ of the conventional elliptic curve encryption processing. Furthermore, it is not necessary to recover the y or Y coordinate.

DETAILED DESCRIPTION

Figure 1:
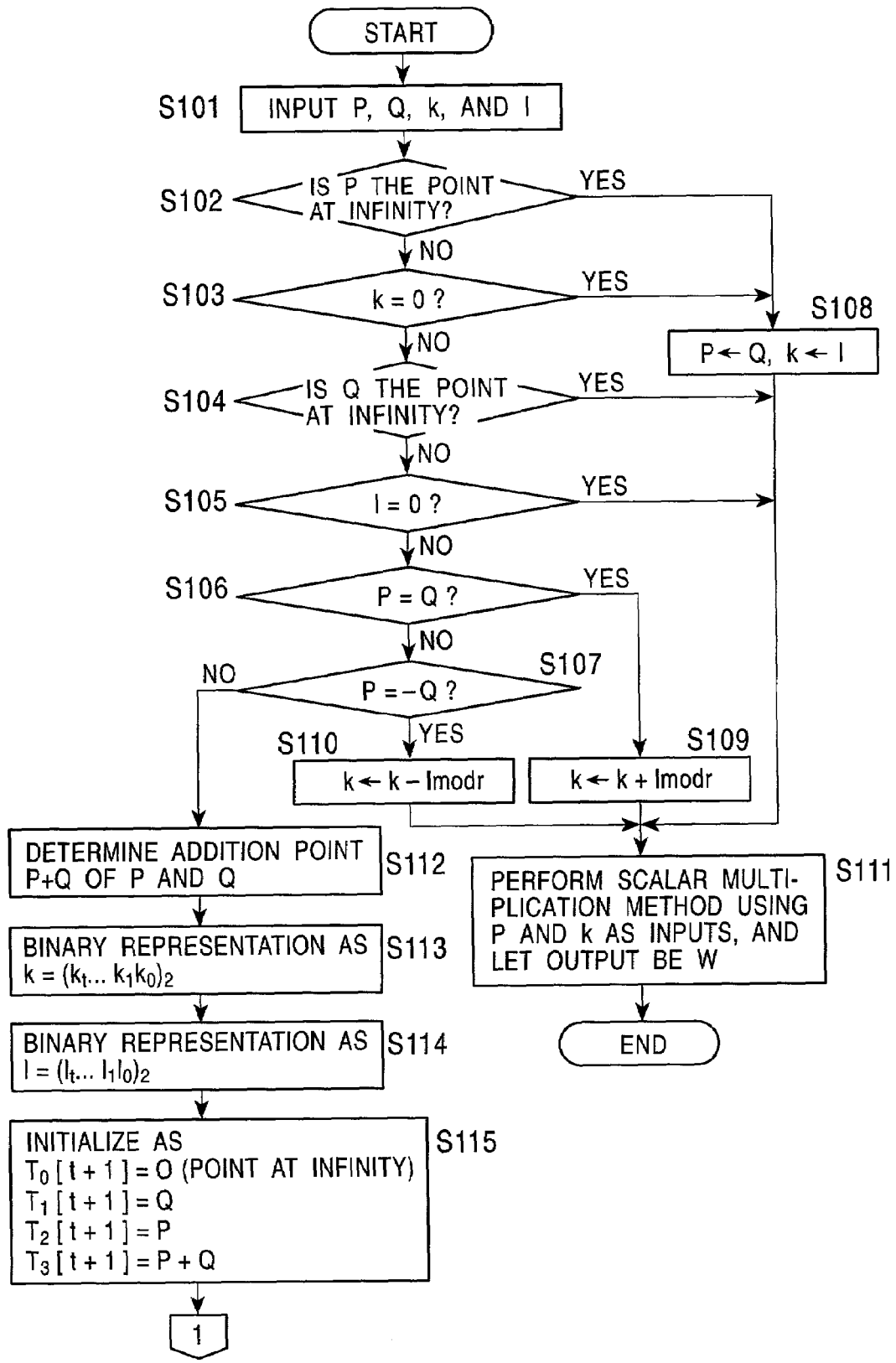
FIG. 1 shows a scalar multiplication process flowchart (1) in which four points on an elliptic curve are used.
Figure 2:
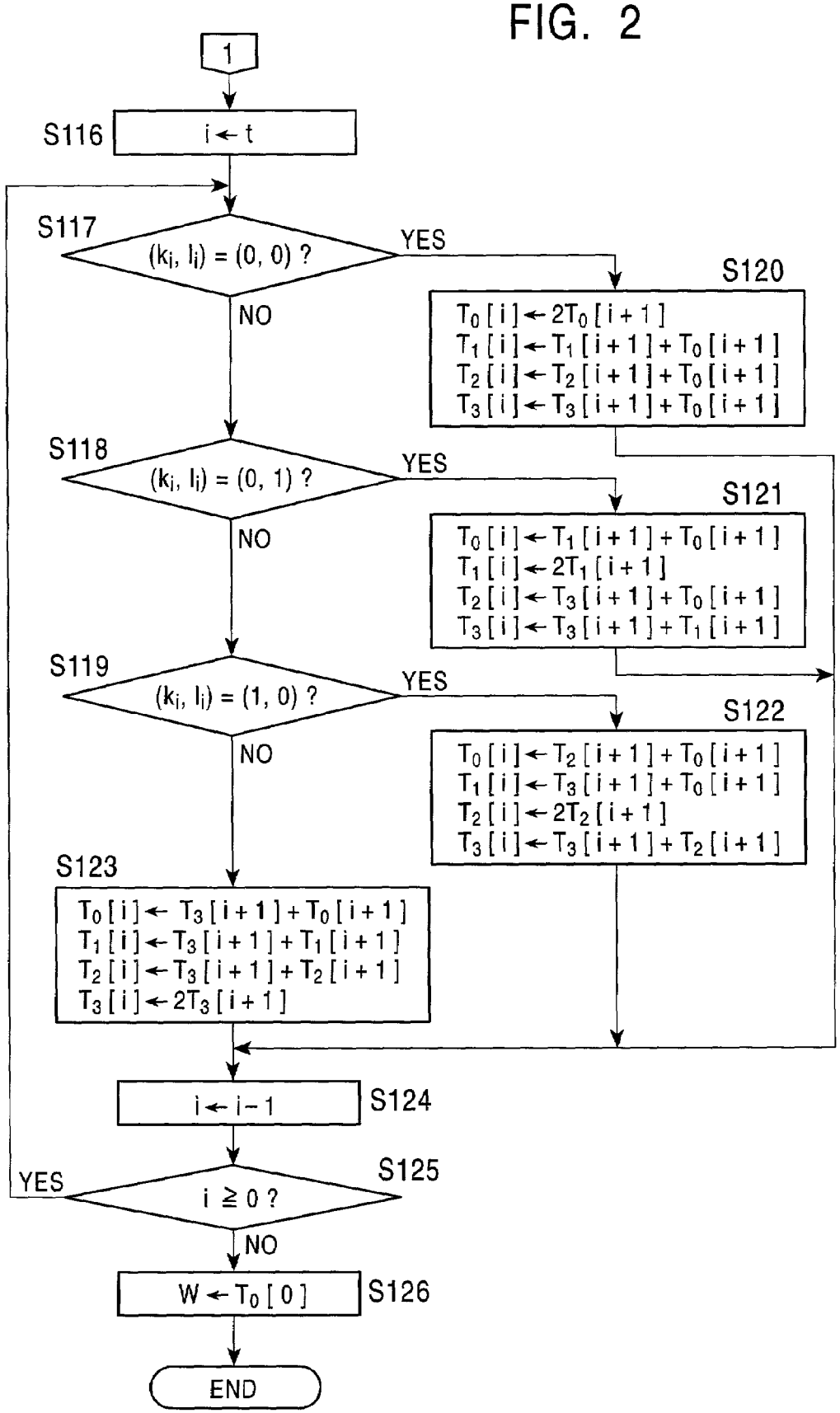
FIG. 2 shows a scalar multiplication process flowchart (2) in which four points on an elliptic curve are used.

A description is given below of an elliptic curve encryption processing method and an elliptic curve encryption processing apparatus of the present invention, that is, a construction in which the addition point kP+lQ of scalar multiplication points of two different points on a Montgomery elliptic curve on a prime field and on elliptic curves on two extension fields are calculated simultaneously. In the following description, the method of simultaneously calculating the addition point kP+lQ of scalar multiplication points of two different points on a Montgomery elliptic curve on a prime field and on elliptic curves on two extension fields is called a "simultaneous scalar multiplication process".

The scalar multiplication employing the Montgomery method described above in the Background of the Invention may be summarized as a calculation method such as that described below. More specifically, in conventional scalar multiplication kP ($k=(k_t \ldots k_0)_2$, $k_t=1$) according to the Montgomery method, computations proceed while two points $m_iP$ and $(m_i+1)P$ are always calculated with respect to $m_i=(k_t \ldots k_i)_2$.

[First Embodiment]

A first embodiment of the present invention will now be described. In the construction of this embodiment, when the binary representation of the scalar quantities k and l contained in the addition point kP+lQ of scalar multiplication points of two different points on an elliptic curve are $(k_t \ldots k_0)_2$ and $(l_t \ldots l_0)_2$, and when $m_i = (k_t \ldots k_i)_2$ and $n_i = (l_t \ldots l_i)_2$, where $k_t = 1$ or $l_t = 1$, a set $G_i$ of four points on an elliptic curve is defined as follows:

$$G_i = \{m_i P + n_i Q, \quad \text{Equation (1)}$$
$$m_i P + (n_i + 1)Q,$$
$$(m_i + 1)P + n_i Q,$$
$$(m_i + 1)P + (n_i + 1)Q\}$$

At this time, in the case of $(k_i, l_i) = (0, 0)$, since $m_i = 2m_{i+1}$ and $n_i = 2n_{i+1}$, the correspondence between a set $G_{i+1}$ of four points and the set $G_i$ of four points can be determined on the basis of the following equation (2):

$$m_i P + n_i Q = 2(m_{i+1} P + n_{i+1} Q) \quad \text{Equation (2)}$$
$$m_i P + (n_i + 1)Q = (m_{i+1} P + (n_{i+1} + 1)Q) + (m_{i+1} P + n_{i+1} Q)$$
$$(m_i + 1)P + n_i Q = ((m_{i+1} + 1)P + n_{i+1} Q) + (m_{i+1} P + n_{i+1} Q)$$
$$(m_i + 1)P + (n_i + 1)Q = ((m_i + 1)P + (n_{i+1} + 1)Q) + (m_{i+1} + 1)P + n_{i+1} Q)$$

Furthermore, in the case of $(k_i, l_i) = (0, 1)$, since $m_i = 2m_{i+1}$ and $n_i = 2n_{i+1} + 1$, the correspondence between a set $G_{i+1}$ of four points and the set $G_i$ of four points can be determined on the basis of the following equation (3):

$$m_i P + n_i Q = (m_{i+1} P + (n_{i+1} + 1)Q) + \quad \text{Equation (3)}$$
$$(m_{i+1} P + n_{i+1} Q)$$
$$m_i P + (n_i + 1)Q = 2(m_{i+1} P + (n_{i+1} + 1)Q)$$
$$((m_i + 1)P + n_i Q = ((m_{i+1} + 1)P + (n_{i+1} + 1)Q) + (m_{i+1} P + n_{i+1} Q)$$
$$(m_i + 1)P + (n_i + 1)Q = ((m_{i+1} + 1)P + (n_{i+1} + 1)Q) + (m_{i+1} P + (n_{i+1} + 1)Q)$$

Furthermore, in the case of $(k_i, l_i) = (1, 0)$, since $m_i = 2m_{i+1} + 1$ and $n_i = 2n_{i+1}$, the correspondence between a set $G_{i+1}$ of four points and the set $G_i$ of four points can be determined on the basis of the following equation (4):

$$m_i P + n_i Q = ((m_{i+1} + 1)P + n_{i+1} Q) + \quad \text{Equation (4)}$$
$$(m_{i+1} P + n_{i+1} Q)$$
$$m_i P + (n_i + 1)Q = ((m_{i+1} + 1)P + (n_{i+1} + 1)Q) + (m_{i+1} P + n_{i+1} Q)$$

$$(m_i + 1)P + n_i Q = 2((m_{i+1} + 1)P + n_{i+1} Q)$$
$$(m_i + 1)P + (n_i + 1)Q = ((m_{i+1} + 1)P + (n_{i+1} + 1)Q) + ((m_{i+1} + 1)P + n_{i+1} Q)$$

Furthermore, in the case of $(k_i, l_i) = (1, 1)$, since $m_i = 2m_{i+1} + 1$ and $n_i = 2n_{i+1} + 1$, the correspondence between a set $G_{i+1}$ of four points and the set $G_i$ of four points can be determined on the basis of equation (5) below:

$$m_i P + n_i Q = ((m_{i+1} + 1)P + (n_{i+1} + 1)Q)) + \quad \text{Equation (5)}$$
$$(m_{i+1} P + n_{i+1} Q)$$
$$m_i P + (n_i + 1)Q = ((m_{i+1} + 1)P + (n_{i+1} + 1)Q) + (m_{i+1} P + (n_{i+1} + 1)Q)$$
$$(m_i + 1)P + n_i Q = ((m_i + 1)P + (n_{i+1} + 1)Q) + ((m_{i+1} + 1)P + n_{i+1} Q)$$
$$(m_i + 1)P + (n_i + 1)Q = 2((m_{i+1} + 1)P + (n_{i+1} + 1)Q)$$

Based on each of the above equations (2), (3), (4), and (5), $G_i$ can be determined from $G_{i+1}$.

Here, assuming that $T_0[i] = m_i P + n_i Q$ $T_1[i] = m_i P + (n_i + 1)Q$ $T_2[i] = (m_i + 1)P + n_i Q$ $T_3[i] = (m_i + 1)P + (n_i + 1)Q$, the equation is expressed as $G_i = \{T_0[i], T_1[i], T_2[i], T_3[i]\}$ Since $m_{t+1} = 0$ and $n_{t+1} = 0$, by setting the initial value $G_{t+1}$ of $G_i$ as $T_0[t+1] = O$ (point at infinity)

$T_1[t+1] = Q$ $T_2[t+1] = P$ $T_3[t+1] = P + Q$, a process in accordance with the flowchart in FIG. 1 is performed to determine kP+lQ (=W).

Referring to the flowchart in FIG. 1, a process in which an elliptic curve encryption processing method of the present invention is used will be described below.

Initially, in step S101, P, Q, k, l, and r are input. Next, in steps S102 and S103, a check is made to determine whether or not kP is a point at infinity (O).

More specifically, when it is determined in step S102 that the point P is a point at infinity (O), since kP becomes a point at infinity (O), W=lQ, and the process proceeds to step S108, where a calculation of lQ is performed. Similarly, when it is determined in step S103 that k is 0, since kP becomes a point at infinity (O), W=lQ, and the process proceeds to step S108, where a calculation of lQ is performed. In step S108, Q is substituted into P, and l is substituted for k so that lQ is converted into the calculation of kP, and the process proceeds to step S111.

Next, in steps S104 and S105, a check is made to determine whether lQ is a point at infinity (O).

More specifically, when it is determined in step S104 that a point Q is a point at infinity (O), since lQ becomes a point at infinity (O), W=kP, and the process proceeds to step S111, where a calculation of kP is performed. Similarly, when it is determined in step S105 that l is 0, since lQ becomes a point at infinity (O), W=kP, and the process proceeds to step S111, where a calculation of kP is performed.

In step S106, it is determined whether P=Q. When P=Q, since W=kP+lQ=(k+l)P, in step S109, k=k+l mod r is set to convert (k+l)P into a calculation of kP, and then the process proceeds to step S111. In step S107, it is determined whether P=−Q. When P=−Q, since W=kP+lQ=(k−l)P, in step S110, k=k−l mod r is set to convert (k−l)P into a calculation of kP, and then the process proceeds to step S111.

When the determination is "Yes" in steps S102 to S107, since the calculation of kP+lQ has been converted into the calculation of kP in steps S108 to S110, in step S111, a scalar multiplication calculation is performed by using P and k as inputs in order to obtain an output W, and then the processing is terminated.

In step S112, an addition point P+Q of P and Q is determined. In step S113, k is subjected to dyadic expansion, and in step S114, l is subjected to dyadic expansion. At this time, $k_t=1$ or $l_t=1$. In step S115, the initial value $G_{t+1}$ of $G_i$ is set as follows:

$T_0[t+1]=O$ (point at infinity)

$T_1[t+1]=Q$ $T_2[t+1]=P$ $T_3[t+1]=P+Q$, and in step S116, i is initialized to t (i=t).

In steps S117 to S125, $G_i$ is calculated from $G_{i+1}$ according to each bit $(k_i, l_i)$ of the dyadically-expanded k and l to eventually determine $G_0$.

More specifically, when it is determined in step S117 that $(k_i, l_i)=(0, 0)$, the following are set in step S120 on the basis of equation (2) described above:

$T_0[i]=2T_0[i+1]$ $T_1[i]=T_1[i+1]+T_0[i+1]$ $T_2[i]=T_2[i+1]+T_0[i+1]$ $T_3[i]=T_3[i+1]+T_0[i+1]$ and $G_i$ is calculated from $G_{i+1}$.

When it is determined in step S118 that $(k_i, l_i)=(0, 1)$, the following are set in step S121 on the basis of equation (3) described above:

$T_0[i]=T_1[i+1]+T_0[i+1]$ $T_1[i]=2T_1[i+1]$ $T_2[i]=T_3[i+1]+T_0[i+1]$ $T_3[i]=T_3[i+1]+T_1[i+1]$ and $G_i$ is calculated from $G_{i+1}$.

When it is determined in step S119 that $(k_i, l_i)=(1, 0)$, the following are set in step S122 on the basis of equation (4) described above:

$T_0[i]=T_2[i+1]+T_0[i+1]$ $T_1[i]=T_3[i+1]+T_0[i+1]$ $T_2[i]=2T_2[i+1]$ $T_3[i]=T_3[i+1]+T_2[i+1]$ and $G_i$ is calculated from $G_{i+1}$.

When the determination is "No" in steps S117 to S119, that is, when it is determined that $(k_i, l_i)=(1, 1)$, the following are set in step S123 on the basis of equation (5) described above:

$T_0[i]=T_3[i+1]+T_0[i+1]$ $T_1[i]=T_3[i+1]+T_1[i+1]$ $T_2[i]=T_3[i+1]+T_2[i+1]$ $T_3[i]=2T_3[i+1]$ and $G_i$ is calculated from $G_{i+1}$.

In step S124, i−1 is substituted into i, and in step S125, a check is made to determine whether or not i≧0. When i≧0, the process returns to step S117, where the same processes are repeatedly performed.

When the determination of i≧0 is "No" in step S125, it follows that $G_0$ is computed, and the process proceeds to step S126.

In the addition of points using the Montgomery method, it is required that the difference point be known, and the difference point can be found on the basis of the following:

$T_1[i+1]-T_0[i+1]=Q$ $T_2[i+1]-T_0[i+1]=P$ $T_3[i+1]-T_0[i+1]=P+Q$ $T_3[i+1]-T_1[i+1]=P$ $T_3[i+1]-T_2[i+1]=Q$

Here, since $m_0=k$ and $n_0=l$, $T_0[0]=kP+lQ$. In step S126, $T_0[0]$ is substituted into W, so that the addition point kP+lQ of scalar multiplication of two points=W=$T_0[0]$, and the processing is terminated.

$T_3[i+1]+T_0[i+1]$ may also be $T_2[i+1]+T_1[i+1]$. In this case, since $T_2[i+1]-T_1[i+1]$=P−Q, it is necessary to calculate the difference P−Q between P and Q in advance.

As described above, in the construction of the present invention, the scalar multiplication kP+lQ is performed by defining a set $G_i$ of four points on an elliptic curve, and thus the results can be output at high speed.

[Second Embodiment]

Next, a processing construction in which the first embodiment is made even faster is described as a second embodiment. Similarly to the first embodiment, when the binary representation of the scalar quantities k and l contained in the addition point: kP+lQ of scalar multiplication of two different points on an elliptic curve are $(k_t \ldots k_0)_2$ and $(l_t \ldots l_0)_2$, and when $m_i=(k_t \ldots k_i)_2$ and $n_i=(l_t \ldots l_i)_2$, where $k_t=1$ or $l_t=1$, a set $G_i$ of four points on an elliptic curve is defined as follows in a manner similar to the first embodiment:

$G_i=\{m_iP+n_iQ, m_iP+(n_i+1)Q, (m_i+1)P+n_iQ, (m_i+1)P+(n_i+1)Q\}$

At this time, in the case of $(k_i, l_i)$ (0, 0), since $m_i=2m_{i+1}$ and $n_i=2n_{i+1}$, the correspondence between a set $G_{i+1}$ of four points and the set $G_i$ of four points can be determined on the basis of equation (2) described above, that is, the following equation:

$$m_iP + n_iQ = 2(m_{i+1}P + n_{i+1}Q) \quad \text{Equation (2)}$$

$$m_iP + (n_i + 1)Q = (m_{i+1}P + (n_{i+1} + 1)Q) + (m_{i+1}P + n_{i+1}Q)$$

$$(m_i + 1)P + n_iQ = ((m_{i+1} + 1)P + n_{i+1}Q) + (m_{i+1}P + n_{i+1}Q)$$

$$(m_i + 1)P + (n_i + 1)Q = ((m_{i+1} + 1)P + (n_{i+1} + 1)Q) + (m_{i+1}P + n_{i+1}Q)$$

This equation (2) can be transformed as shown below:

$$m_iP + n_iQ = 2(m_{i+1}P + n_{i+1}Q) \quad \text{Equation (6)}$$

$$m_iP + (n_i + 1)Q = (m_{i+1}P + (n_{i+1} + 1)Q) + (m_{i+1}P + n_{i+1}Q)$$

$$(m_i + 1)P + n_iQ = ((m_{i+1} + 1)P + n_{i+1}Q) + (m_{i+1}P + n_{i+1}Q)$$

$$(m_i + 1)P + (n_i + 1)Q = ((m_{i+1} + 1)P + n_{i+1}Q) + (m_{i+1}P + (n_i + 1)Q)$$

In this equation (6), the element $(m_{i+1}+1)P+(n_{i+1}+1)Q$ of $G_{i+1}$ is an element which is not required to determine $G_i$.

Furthermore, in the case of $(k_i, l_i)=(0, 1)$, the correspondence between a set $G_{i+1}$ of four points and the set $G_i$ of four points is shown based on equation (3) described above. In equation (3), the element $(m_{i+1}+1)P+n_{i+1}Q$ is an element which is not required to determine $G_i$.

Furthermore, in the case of $(k_i, l_i)=(1, 0)$, the correspondence between a set $G_{i+1}$ of four points and the set $G_i$ of four points is shown based on equation (4) described above. In equation (4), the element $m_{i+1}P+(n_{i+1}+1)Q$ is an element which is not required to determine $G_i$.

In the case of $(k_i, l_i)=(1, 1)$, the correspondence between a set $G_{i+1}$ of four points and the set $G_i$ of four points is shown based on equation (5) described above. Equation (5) can be transformed as shown below:

$$m_iP + n_iQ = ((m_{i+1} + 1)P + n_{i+1}Q) + (m_{i+1}P + (n_{i+1} + 1)Q) \quad \text{Equation (7)}$$

$$m_iP + (n_i + 1)Q = ((m_{i+1} + 1)P + (n_{i+1} + 1)Q) + (m_{i+1}P + (n_{i+1} + 1)Q)$$

$$(m_i + 1)P + n_iQ = ((m_i + 1)P + (n_{i+1} + 1)Q) + ((m_{i+1} + 1)P + n_{i+1}Q)$$

$$(m_i + 1)P + (n_i + 1)Q = 2((m_{i+1} + 1)P + (n_{i+1} + 1)Q)$$

As is clear from equation (7) described above, the element $m_{i+1}P+n_{i+1}Q$ of $G_{i+1}$ is an element which is not required to determine $G_i$.

In the manner described above, in the correspondence relation between the set $G_{i+1}$ of four points and the set $G_i$ of four points in each case of $(k_i, l_i)$, described in the first embodiment, the element $(m_{i+1}+1-k_i)P+(n_{i+1}+1-l_i)Q$ of $G_{i+1}$ can be defined as an element which is not required to determine $G_i$.

Therefore, the set $G_i$ of four points used in the first embodiment is defined as a set $G'_i$ of three points as shown in equation (8) below:

$$G'_i = G_i - \{(m_i+1-k_{i-1})P+(n_i+1-l_{i-1})Q\} \quad \text{Equation (8)}$$

At this time, since $G_i$ can be calculated from $G'_{i+1}$, it is possible to calculate $G'_i$ from $G'_{i+1}$. Here, when $G'_i$ is calculated from $G'_{i+1}$, the calculation method therefor depends on $(k_i, l_i)$. In addition, when $G'_i$ is defined from $G_i$, since the calculation method depends on $(k_{i-1}, l_{i-1})$, when $G'_i$ is calculated from $G'_{i+1}$, the calculation method therefor depends on $(k_i, l_i, k_{i-1}, l_{i-1})$.

A technique for calculating $G'_i$ from $G'_{i+1}$, corresponding to $(k_i, l_i, k_{i-1}, l_{i-1})$, will be described below.

First, in the case of $(k_i, l_i, k_{i-1}, l_{i-1})=(0, 0, 0, 0)$, the following are satisfied:

$$G'_{i+1} = \{m_{i+1}P+n_{i+1}Q, \quad m_{i+1}P+(n_{i+1}+1)Q, \quad (m_{i+1}+1)P+n_{i+1}Q\}$$

$$G'_i = \{m_iP+n_iQ, m_iP+(n_i+1)Q, (m_i+1)P+n_iQ\}$$

Therefore, based on equation (6) described above, $G'_i$ is calculated from $G'_{i+1}$ on the basis of the following equation (9):

$$m_iP + n_iQ = 2(m_{i+1}P + n_{i+1}Q) \quad \text{Equation (9)}$$

$$m_iP + (n_i + 1)Q = (m_{i+1}P + (n_{i+1} + 1)Q) + (m_{i+1}P + n_{i+1}Q)$$

$$(m_i + 1)P + n_iQ = ((m_{i+1} + 1)P + n_{i+1}Q) + (m_{i+1}P + n_{i+1}Q)$$

Next, in the case of $(k_i, l_i, k_{i-1}, l_{i-1})=(0, 0, 0, 1)$, the following are satisfied:

$$G'_{i+1} = \{m_{i+1}P+n_{i+1}Q, \quad m_{i+1}P+(n_{i+1}+1)Q, \quad (m_{i+1}+1)P+n_{i+1}Q\}$$

$$G'_i = \{m_iP+n_iQ, m_iP+(n_i+1)Q, (m_{i+1}+1)P+(n_i+1)Q\}$$

Therefore, based on equation (6) described above, $G'_i$ is calculated from $G'_{i+1}$ on the basis of the following equation (10):

$$m_iP + n_iQ = 2(m_{i+1}P + n_{i+1}Q) \quad \text{Equation (10)}$$

$$m_iP + (n_i + 1)Q = (m_{i+1}P + (n_{i+1} + 1)Q) + (m_{i+1}P + n_{i+1}Q)$$

$$(m_i + 1)P + (n_i + 1)Q = ((m_{i+1} + 1)P + n_{i+1}Q) + (m_{i+1}P + (n_{i+1} + 1)Q)$$

Next, in the case of $(k_i, l_i, k_{i-1}, l_{i-1})=(0, 0, 1, 0)$, the following are satisfied:

$$G'_{i+1} = \{m_{i+1}P+n_{i+1}Q, \quad m_{i+1}P+(n_{i+1}+1)Q, \quad (m_{i+1}+1)P+n_{i+1}Q\}$$

$$G'_i = \{m_iP+n_iQ, (m_i+1)P+n_iQ, (m_i+1)P+(n_i+1)Q\}$$

Therefore, based on equation (6) described above, $G'_i$ is calculated from $G'_{i+1}$ on the basis of the following equation (11):

$$m_iP + n_iQ = 2(m_{i+1}P + n_{i+1}Q) \quad \text{Equation (11)}$$

$$(m_i+1)P + n_iQ = ((m_{i+1}+1)P + n_{i+1}Q) +$$

$$(m_{i+1}P + n_{i+1}Q)$$

$$(m_i+1)P + (n_i+1)Q = ((m_{i+1}+1)P + n_{i+1}Q) +$$

$$(m_{i+1}P + (n_i+1)Q)$$

Next, in the case of $(k_i, l_i, k_{i-1}, l_{i-1})=(0, 0, 1, 1)$, the following are satisfied:

$G'_{i+1} = \{m_{i+1}P + n_{i+1}Q, \; m_{i+1}P + (n_{i+1}+1)Q, \; (m_{i+1}1)P + n_{i+1}1Q\}$ $G'_i = \{m_iP + (n_i+1)Q, (m_i+1)P + n_Q, (m_i1)P + (n_i+1)Q\}$

Therefore, based on equation (6) described above, $G'_i$ is calculated from $G'_{i+1}$ on the basis of the following equation (12):

$$m_iP + (n_i+1)Q = (m_{i+1}P + (n_{i+1}+1)Q) + \quad \text{Equation (12)}$$

$$(m_{i+1}P + n_{i+1}Q)$$

$$(m_i+1)P + n_iQ = ((m_{i+1}+1)P + n_{i+1}Q) +$$

$$(m_{i+1}P + n_{i+1}Q)$$

$$(m_i+1)P + (n_i+1)Q = ((m_{i+1}+1)P + n_{i+1}Q) +$$

$$(m_{i+1}P + (n_i+1)Q)$$

Next, in the case of $(k_i, l_i, k_{i-1}, l_{i-1})=(0, 1, 0, 0)$, the following are satisfied:

$G'_{i+1} = \{m_{i+1}P + n_{i+1}Q, \; m_{i+1}P + (n_{i+1}+1)Q, \; (m_{i+1}+1)P + (n_{i+1}+1)Q\}$ $G'_i = \{m_iP + n_iQ, \; m_iP + (n_i+1)Q, \; (m_{i+1}+1)P + n_iQ\}$

Therefore, based on equation (3) described above, $G'_i$ is calculated from $G'_{i+1}$ on the basis of the following equation (13):

$$m_iP + n_iQ = (m_{i+1}P + (n_{i+1}+1)Q) + \quad \text{Equation (13)}$$

$$(m_{i+1}P + n_{i+1}Q)$$

$$m_iP + (n_i+1)Q = 2(m_{i+1}P + (n_{i+1}+1)Q)$$

$$(m_i+1)P + n_iQ = ((m_{i+1}+1)P + (n_{i+1}+1)Q) +$$

$$(m_{i+1}P + n_{i+1}Q)$$

Next, in the case of $(k_i, l_i, k_{i-1}, l_{i-1})=(0, 1, 0, 1)$, the following are satisfied:

$G'_{i+1} = \{m_{i+1}P + n_{i+1}Q, \; m_{i+1}P + (n_{i+1}+1)Q, \; (m_{i+1}+1)P + (n_{i+1}+1)Q\}$ $G'_i = \{m_iP + n_iQ, \; m_iP + (n_i+1)Q, \; (m_i+1)P + (n_i1)Q\}$

Therefore, based on equation (3) described above, $G'_i$ is calculated from $G+_{i+1}$ on the basis of the following equation (14):

$$m_iP + n_iQ = (m_{i+1}P + (n_{i+1}+1)Q) + \quad \text{Equation (14)}$$

$$(m_{i+1}P + n_{i+1}Q)$$

$$m_iP + (n_i+1)Q = 2(m_{i+1}P + (n_i+1)Q)$$

$$(m_i+1)P + (n_i+1)Q = ((m_{i+1}+1)P + (n_{i+1}+1)Q) +$$

$$(m_{i+1}P + (n_{i+1}+1)Q)$$

Next, in the case of $(k_i, l_i, k_{i-1}, l_{i-1})=(0, 1, 1, 0)$, the following are satisfied:

$G'_{i+1} = \{m_{i+1}P + n_{i+1}Q, \; m_{i+1}P + (n_{i+1}+1)Q, \; (m_{i+1}+1)P + (n_{i+1}+1)Q\}$ $G'_i = \{m_iP + n_iQ, \; (m_i+1)P + n_iQ, \; (m_i+1)P + (n_i+1)Q\}$

Therefore, based on equation (3) described above, $G'_i$ is calculated from $G'_{i+1}$ on the basis of the following equation (15):

$$m_iP + n_iQ = (m_{i+1}P + (n_{i+1}+1)Q) + \quad \text{Equation (15)}$$

$$(m_{i+1}P + n_{i+1}Q)$$

$$(m_i+1)P + n_iQ = ((m_{i+1}+1)P + (n_{i+1}+1)Q) +$$

$$(m_{i+1}P + n_{i+1}Q)$$

$$(m_i+1)P + (n_i+1)Q = ((m_{i+1}+1)P + (n_{i+1}+1)Q) +$$

$$(m_{i+1}P + (n_{i+1}+1)Q)$$

Next, in the case of $(k_i, l_i, k_{i-1}, l_{i-1})=(0, 1, 1, 1)$, the following are satisfied:

$G'_{i+1} = \{m_{i+1}P + n_{i+1}Q, \; m_{i+1}P + (n_{i+1}+1)Q, \; (m_{i+1}+1)P + (n_{i+1}+1)Q\}$ $G'_i = \{m_iP + (n_i1)Q, \; (m_i+1)P + n_iQ, \; (m_i+1)P + (n_i+1)Q\}$

Therefore, based on equation (3) described above, $G'_i$ is calculated from $G'_{i+1}$ on the basis of the following equation (16):

$$m_iP + (n_i+1)Q = 2(m_{i+1}P + (n_{i+1}+1)Q) \quad \text{Equation (16)}$$

$$(m_i+1)P + n_iQ = ((m_{i+1}+1)P + (n_{i+1}+1)Q) +$$

$$(m_{i+1}P + n_{i+1}Q)$$

$$(m_i+1)P + (n_i+1)Q = ((m_{i+1}+1)P + (n_{i+1}+1)Q) +$$

$$(m_{i+1}P + (n_{i+1}+1)Q)$$

Next, in the case of $(k_i, l_i, k_{i-1}, l_{i-1})=(1, 0, 0, 0)$, the following are satisfied:

$G'_{i+1} = \{m_{i+1}P + n_{i+1}Q, \; m_{i+1}P + n_{i+1}Q, \; (m_{i+1}+1)P + (n_{i+1}+1)Q\}$ $G'_i = \{m_iP + n_iQ, \; m_iP + (n_i+1)Q, \; (m_i1)P + n_iQ\}$

Therefore, based on equation (4) described above, $G'_i$ is calculated from $G'_{i+1}$ on the basis of the following equation $$m_iP + n_iQ = ((m_{i+1})P + n_{i+1}Q) + \quad \text{Equation (17)}$$

-continued $$(m_{i+1}P + n_{i+1}Q)$$
$$m_iP + (n_i + 1)Q = ((m_{i+1} + 1)P + (n_{i+1} + 1)Q) +$$
$$(m_{i+1}P + n_{i+1}Q)$$
$$(m_i + 1)P + n_iQ = 2((m_{i+1} + 1)P + n_{i+1}Q)$$

Next, in the case of $(k_i, l_i, k_{i-1}, l_{i-1}) = (1, 0, 0, 1)$, the following are satisfied:

$G'_{i+1} = \{m_{i+1}P + n_{i+1}Q, (m_{i+1}+1)P + n_{i+1}Q, (m_{i+1}+1)P + (n_{i+1}+1)Q\}$ $G'_i = \{m_iP + n_iQ, m_iP + (n_i+1)Q, (m_i+1)P + (n_i+1)Q\}$

Therefore, based on equation (4) described above, $G'_i$ is calculated from $G'_{i+1}$ on the basis of the following equation (18):

$$m_iP + n_iQ = ((m_{i+1} + 1)P + n_{i+1}Q) + \qquad \text{Equation (18)}$$
$$(m_{i+1}P + n_{i+1}Q)$$
$$m_iP + (n_i + 1)Q = ((m_{i+1} + 1)P + (n_{i+1} + 1)Q) +$$
$$(m_{i+1}P + n_{i+1}Q)$$
$$(m_i + 1)P + (n_i + 1)Q = ((m_{i+1} + 1)P + (n_{i+1} + 1)Q) +$$
$$((m_{i+1} + 1)P + n_{i+1}Q)$$

Next, in the case of $(k_1, l_i, k_{i-1}, l_{i-1}) = (1, 0, 1, 0)$, the following are satisfied:

$G'_{i+1} = \{m_{i+1}P + n_{i+1}Q, (m_{i+1}+1)P + n_{i+1}Q, (m_{i+1}+1(P + (n_{i+1}+1)Q\}$ $G'_i = \{m_iP + n_iQ, (m_i+1)P + n_iQ, (m_i+1)P + (n_i+1)Q\}$

Therefore, based on equation (4) described above, $G'_i$ is calculated from $G'_{i+1}$ on the basis of the following equation (19):

$$m_iP + n_iQ = ((m_{i+1} + 1)P + n_{i+1}Q) + \qquad \text{Equation (19)}$$
$$(m_{i+1}P + n_{i+1}Q)$$
$$(m_i + 1)P + n_iQ = 2((m_{i+1} + 1)P + n_{i+1}Q)$$
$$(m_i + 1)P + (n_i + 1)Q = ((m_{i+1} + 1)P + (n_{i+1} + 1)Q) +$$
$$((m_{i+1} + 1)P + n_{i+1}Q)$$

Next, in the case of $(k_i, l_i, k_{i-1}, l_{i-1}) = (1, 0, 1, 1)$, the following are satisfied:

$G'_{i+1} = \{m_{i+1}P + n_{i+1}Q, (m_{i+1}+1)P + n_iQ, (m_{i+1}+1)P + (n_{i+1}+1)Q\}$ $G'_i = \{m_iP + (n_{i+1}+1)Q, (m_i+1)P + n_iQ, (m_i+1)P + (n_i+1)Q\}$

Therefore, based on equation (4) described above, $G'_i$ is calculated from $G'_{i+1}$ on the basis of the following equation (20):

$$m_iP + (n_i + 1)Q = ((m_{i+1} + 1)P + (n_{i+1} + 1)Q) + \qquad \text{Equation (20)}$$
$$(m_{i+1}P + n_{i+1}Q)$$
$$(m_i + 1)P + n_iQ = 2((m_{i+1} + 1)P + n_{i+1}Q)$$
$$(m_i + 1)P + (n_i + 1)Q = ((m_{i+1} + 1)P + (n_{i+1} + 1)Q) +$$
$$((m_{i+1} + 1)P + n_{i+1}Q)$$

Next, in the case of $(k_i, l_i, k_{i-1}, l_{i-1}) = (1, 1, 0, 0)$, the following are satisfied:

$G'_{i+1} = \{m_{i+1}P + (n_{i+1}+1)Q, (m_{i+1}+1)P + n_{i+1}Q, (m_{i+1}+1)P + (n_{i+1}+1)Q\}$ $G'_i = \{m_iP + n_iQ, m_iP + (n_i+1)Q, (m_i+1)P + n_iQ\}$

Therefore, based on equation (7) described above, $G'_i$ is calculated from $G'_{i+1}$ on the basis of the following equation (21):

$$m_iP + n_iQ = ((m_{i+1} + 1)P + n_{i+1}Q) + \qquad \text{Equation (21)}$$
$$(m_{i+1}P + (n_{i+1} + 1)Q)$$
$$m_iP + (n_i + 1)Q = ((m_{i+1} + 1)P + (n_{i+1} + 1)Q) +$$
$$(m_{i+1}P + (n_{i+1} + 1)Q)$$
$$(m_i + 1)P + n_iQ = ((m_{i+1} + 1)P + (n_{i+1} + 1)Q) +$$
$$((m_{i+1} + 1)P + n_{i+1}Q)$$

Next, in the case of $(k_i, l_i, k_{i-1}, l_{i-1}) = (1, 1, 0, 1)$, the following are satisfied:

$G'_{i+1} = \{m_{i+1}P + (n_{i+1}+1)Q, (m_{i+1}+1)P + n_{i+1}Q, (m_{i+1}+1)P + (n_{i+1}+1)Q\}$ $G'_i = \{m_iP + n_iQ, m_iP + (n_i+1)Q, (m_i+1)P + (n_i+1)Q\}$

Therefore, based on equation (7) described above, $G'_i$ is calculated from $G'_{i+1}$ on the basis of the following equation (22):

$$m_iP + n_iQ = ((m_{i+1} + 1)P + n_{i+1}Q) + \qquad \text{Equation (22)}$$
$$(m_{i+1}P + (n_{i+1} + 1)Q)$$
$$m_iP + (n_i + 1)Q = ((m_{i+1} + 1)P + (n_{i+1} + 1)Q) +$$
$$(m_{i+1}P + (n_{i+1} + 1)Q)$$
$$(m_i + 1)P + (n_i + 1)Q = 2((m_{i+1} + 1)P + (n_{i+1} + 1)Q)$$

Next, in the case of $(k_i, l_i, k_{i-1}, l_{i-1}) = (1, 1, 1, 0)$, the following are satisfied:

$G'_{i+1} = \{m_{i+1}P + (n_{i+1}+1)Q, (m_{i+1}+1)P + n_{i+1}Q, (m_{i+1}+1)P + (n_{i+1}+1)Q\}$ $G'_i = \{m_iP + n_iQ, (m_i+1)P + n_iQ, (m_i+1)P + (n_i+1)Q\}$

Therefore, based on equation (7) described above, $G'_i$ is calculated from $G'_{i+1}$ on the basis of the following equation (23):

$$m_iP + n_iQ = ((m_{i+1}+1)P + n_{i+1}Q) + \quad \text{Equation (23)}$$
$$(m_{i+1}P + (n_{i+1}+1)Q)$$
$$(m_i+1)P + n_iQ = ((m_{i+1}+1)P + (n_{i+1}+1)Q) +$$
$$((m_{i+1}+1)P + n_{i+1}Q)$$
$$(m_i+1)P + (n_i+1)Q = 2((m_{i+1}+1)P + (n_{i+1}+1)Q)$$

Lastly, in the case of $(k_i, l_i, k_{i-1}, l_{i-1})=(1, 1, 1, 1)$, the following are satisfied:

$$G'_{i+1} = \{m_{i+1}P+(n_{i+1}+1)Q, (m_{i+1}+1)P+n_{i+1}Q, (m_{i+1}+1)P+(n_{i+1}+1)Q\}$$

$$G'_i = \{m_iP+(n_i+1)Q, (m_i+1)P+n_iQ, (m_i+1)P+(n_1+1)Q\}$$

Therefore, based on equation (7) described above, $G'_i$ is calculated from $G'_{i+1}$ on the basis of the following equation (24):

$$m_iP + (n_i+1)Q = ((m_{i+1}+1)P + (n_{i+1}+1)Q) + \quad \text{Equation (24)}$$
$$(m_{i+1}P + (n_{i+1}+1)Q)$$
$$(m_i+1)P + n_iQ = ((m_{i+1}+1)P + (n_{i+1}+1)Q) +$$
$$((m_{i+1}+1)P + n_{i+1}Q)$$
$$(m_i+1)P + (n_i+1)Q = 2((m_{i+1}+1)P + (n_{i+1}+1)Q)$$

Based on each of the above equations, $G'_i$ can be calculated from $G'_{i+1}$ with respect to all the cases that $(k_i, l_i, k_{i-1}, l_{i-1})$ can take.

Figure 3:
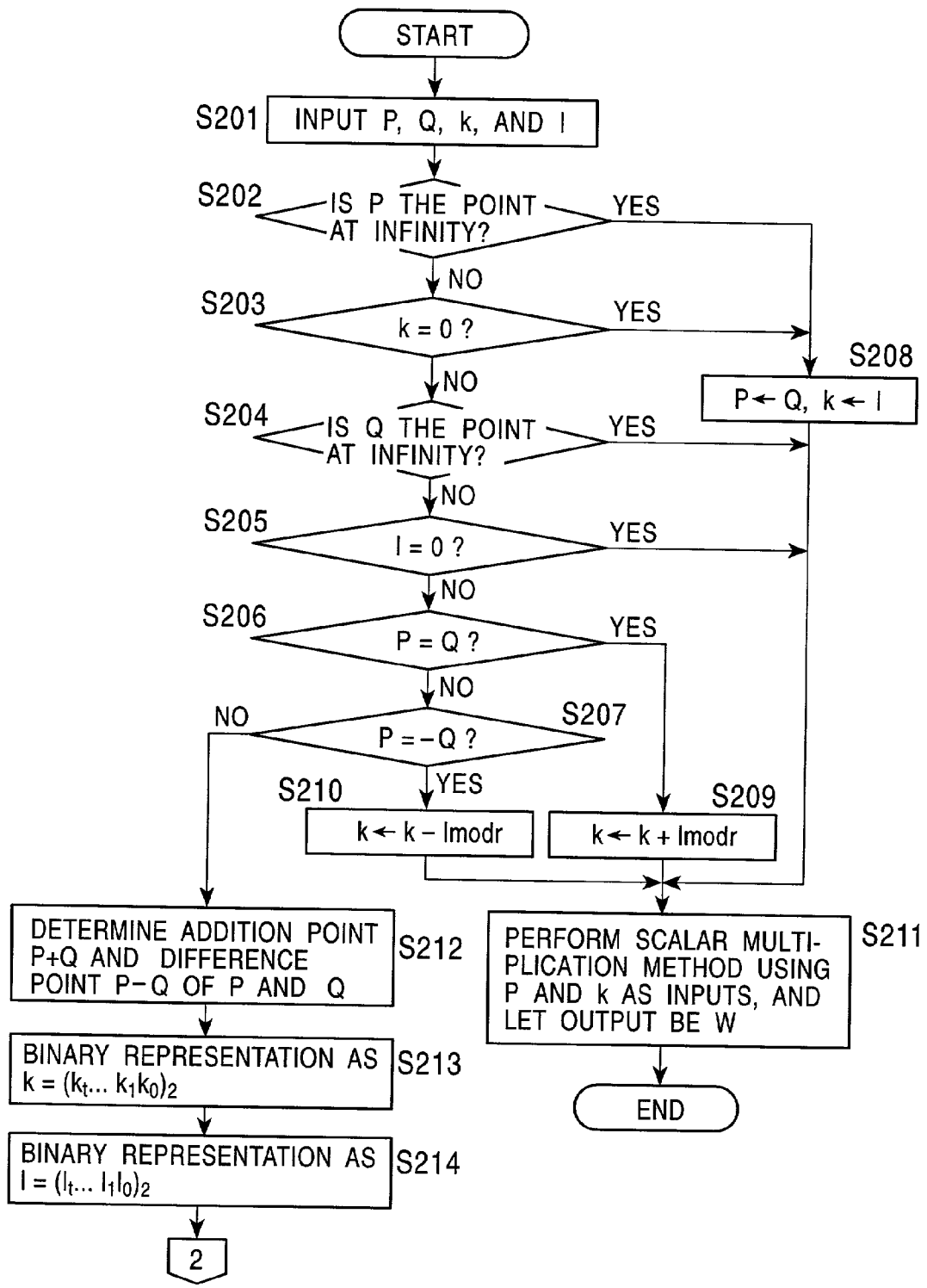
FIG. 3 shows a scalar multiplication process flowchart (1) in which three points on an elliptic curve are used.
Figure 4:
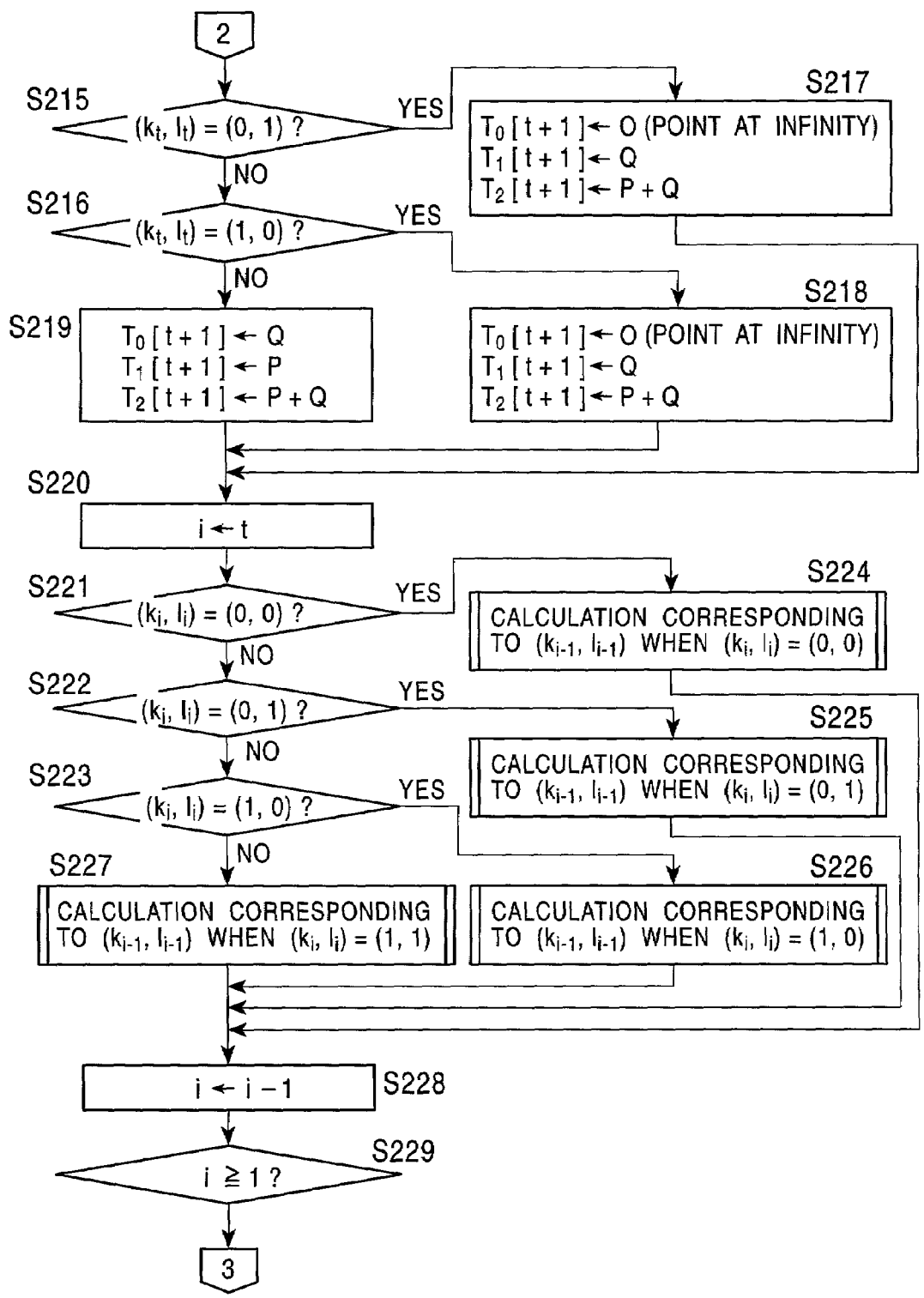
FIG. 4 shows a scalar multiplication process flowchart (2) in which three points on an elliptic curve are used.
Figure 5:
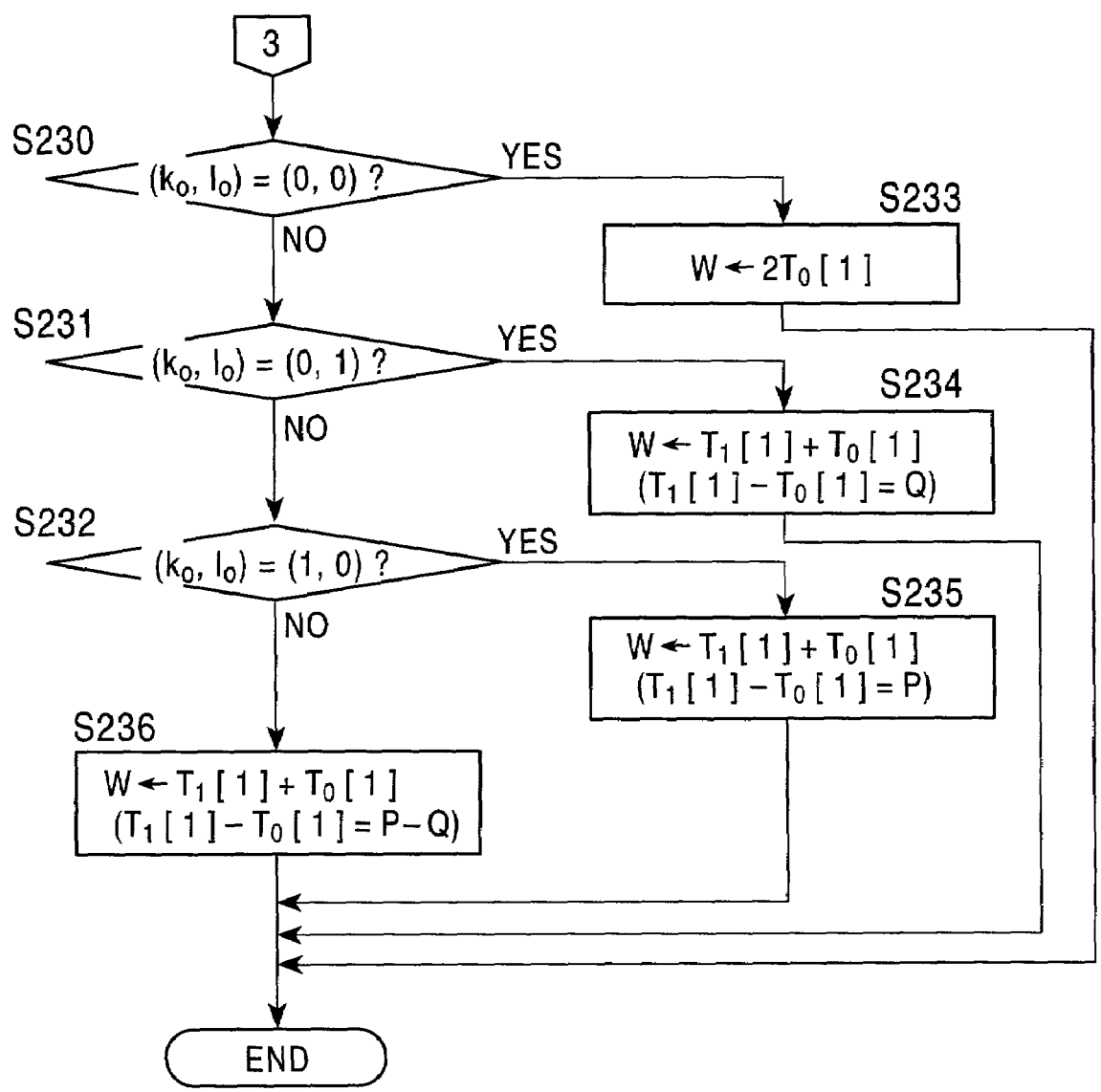
FIG. 5 shows a scalar multiplication process flowchart (3) in which three points on an elliptic curve are used.

A process of determining $W=kP+lQ$ by using the second embodiment will now be described with reference to the flowcharts shown in FIG. 3 and those that follow. The outline of these flowcharts is that $G'_i$ is represented as $G'_i=\{T_0[i], T_1[i], T_2[i]\}$, and based on $m_{t+1}=0$ and $n_{t+1}=0$, the initial value of $G'_{i+1}$ is determined to calculate $G'_i$ so that $W=kP+lQ$ is determined.

Initially, in step S201, P, Q, k, l, and r are input. Next, in steps S202 and S203, a check is made to determine whether or not kP is a point at infinity (O).

More specifically, when it is determined in step S202 that a point P is a point at infinity (O), since kP becomes a point at infinity (O), W=lQ, and the process proceeds to step S208, where a calculation of lQ is performed. Similarly, when it is determined in step S203 that k is 0, since kP becomes a point at infinity (O), W=lQ, and the process proceeds to step S208, where a calculation of lQ is performed. In step S208, Q is substituted into P, and l is substituted into k so that lQ is converted into the calculation of kP, and then the process proceeds to step S211.

Next, in steps S204 and S205, a check is made to determine whether or not lQ is a point at infinity (O).

More specifically, when it is determined in step S204 that a point Q is a point at infinity (O), since lQ becomes a point at infinity (O), W=kP, and the process proceeds to step S211, where a calculation of kP is performed. Similarly, when it is determined in step S205 that l is 0, since lQ becomes a point at infinity (O), W=kP, and the process proceeds to step S211, where a calculation of kP is performed.

In step S206, it is determined whether or not P=Q. When P=Q, since kP+lQ=(k+l)P, in step S209, k=k+l mod r is set to convert (k+l)P into a calculation of kP, and the process proceeds to step S211. In step S207, it is determined whether or not P=−Q. When P=−Q, since W=kP+lQ=(k−l)P, in step S210, k=k−l mod r is set to convert (k−l)P into a calculation of kP, and then the process proceeds to step S211.

When the determination is "Yes" in steps S202 to S207, the calculation of kP+lQ has been converted into the calculation of kP in steps S208 to S210. Therefore, in step S211, a scalar multiplication calculation is performed by using P and k as inputs in order to obtain an output W, and then the processing is terminated.

In step S212, an addition point P+Q and a difference point P−Q of P and Q are determined. In step S213, k is subjected to dyadic expansion, and in step S214, l is subjected to dyadic expansion. At this time, $k_t=1$ or $l_t=1$.

In steps S215 to S219, the initial value $G'_{t+1}$ of $G'_i$ is determined. Initially, when it is determined in step S215 that $(k_t, l_t)=(0, 1)$, since $G'_{t+1}=\{O \text{ (point at infinity)}, Q, P+Q\}$ on the basis of equations (1) and (8), in step S217, the following substitutions are performed:

$$T_0[t+1]=O \text{ (point at infinity)}$$
$$T_1[t+1]=Q$$
$$T_2[t+1]=P+Q$$

Next, when it is determined in step S216 that $(k_t, l_t)=(1, 0)$, since $G'_{t+1}=\{O \text{ (point at infinity)}, Q, P+Q\}$ on the basis of equations (1) and (8), in step S217, the following substitutions are performed:

$$T_0[t+1]=O \text{ (point at infinity)}$$
$$T_1[t+1]=P$$
$$T_2[t+1]=P+Q$$

Lastly, when the determination in steps S216 and S217 is "No", that is, when it is determined that $(k_t, l_t)=(1, 1)$, since $G'_{t+1}=\{Q, P, P+Q\}$ on the basis of equations (1) and (8), in step S217, the following substitutions are performed:

$$T_0[t+1]=Q$$
$$T_1[t+1]=P$$
$$T_2[t+1]=P+Q$$

Thereafter, in step S220, i is initialized to t (i=t). In steps S221 to S229, $G'_i$ is computed from $G'_{i+1}$ according to the value of $(k_i, l_i, k_{i-1}, l_{i-1})$ to eventually determine $G'_1$.

When it is determined in step S221 that $(k_i, l_i)=(0, 0)$, the process of step S224 is performed. The detailed flowchart of the process of step S224 is shown in FIG. 6.

Figure 6:
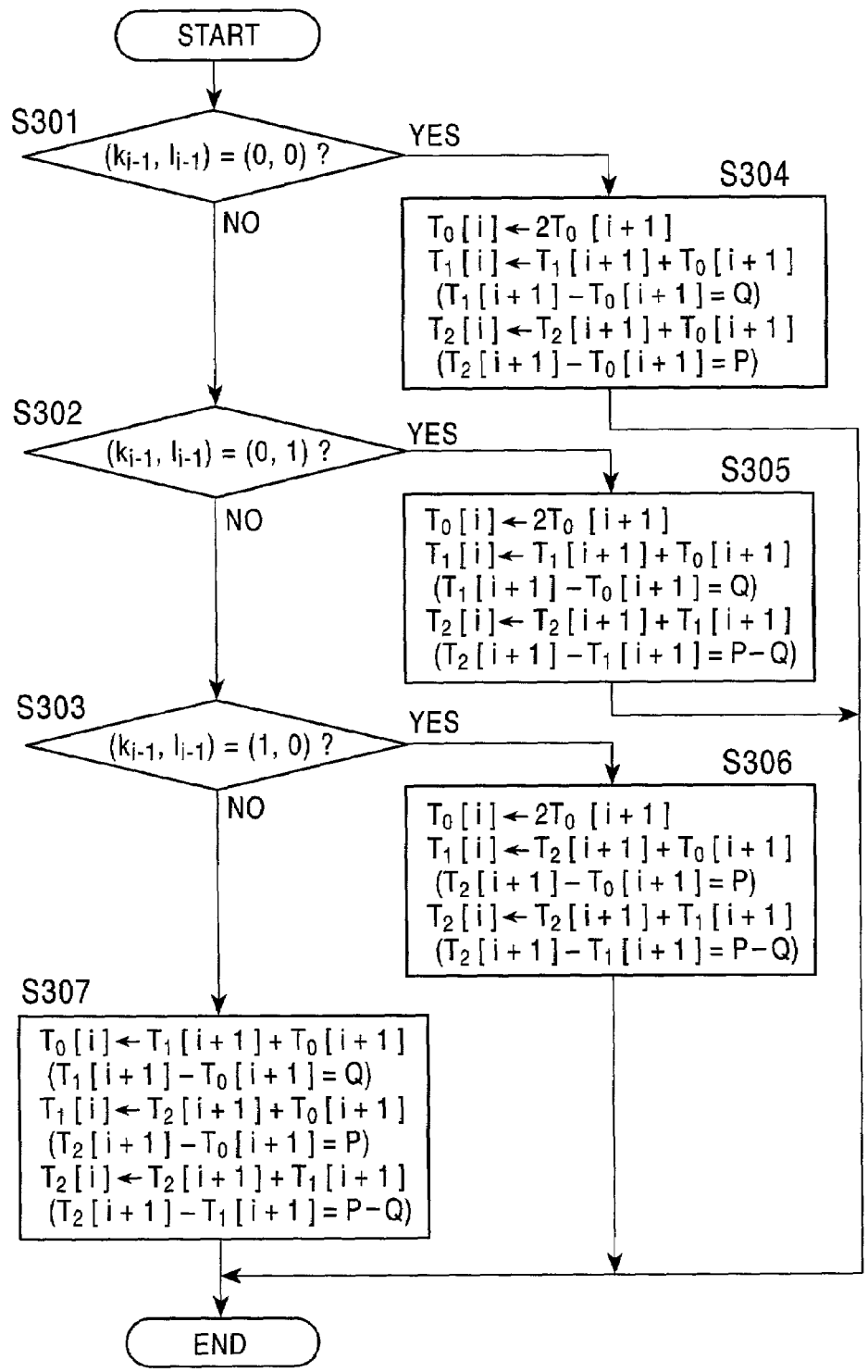
FIG. 6 shows a process flowchart in the case of ($k_i$, $l_i$)=(0, 0) in a scalar multiplication process using three points on an elliptic curve.

When it is determined in step S301 in FIG. 6 that $(k_{i-1}, l_{i-1})=(0, 0)$, in step S304, the following substitutions are performed on the basis of equation (9) described above:

$$T_0[i]=2T_0[i+1]$$
$$T_1[i]=T_1[i+1]+T_0[i+1]$$
$$T_2[i]=T_2[i+1]+T_0[i+1]$$

and $G'_i$ is computed from $G'_{i+1}$.

When it is determined in step S302 that $(k_{i-1}, l_{i-1})=(0, 1)$, in step S305, the following substitutions are performed on the basis of equation (10) described above:

$T_0[i]=2T_0[i+1]$ $T_1[i]=T_1[i+1]+T_0[i+1]$ $T_2[i]=T_2[i+1]+T_1[i+1]$ and $G'_i$ is computed from $G'_{i+1}$.

When it is determined in step S303 that $(k_{i-1}, l_{i-1})=(1, 0)$, in step S306, the following substitutions are performed on the basis of equation (11) described above:

$T_0[i]=2T_0[i+1]$ $T_1[i]=T_2[i+1]+T_0[i+1]$ $T_2[i]=T_2[i+1]+T_1[i+1]$ and $G'_i$ is computed from $G'_{i+1}$.

When the determination is "No" in steps S301 to S303, that is, when it is determined that $(k_{i-1}, l_{i-1})=(1, 1)$, in step S307, the following substitutions are performed on the basis of equation (12) described above:

$T_0[i]=T_1[i+1]+T_0[i+1]$ $T_1[i]=T_2[i+1]+T_0[i+1]$ $T_2[i]=T_2[i+1]+T_1[i+1]$ and $G'_i$ is computed from $G'_{i+1}$.

In steps S304 to S307, the difference points required for the addition of points become as follows:

$T_1[i+1]-T_0[i+1]=Q$ $T_2[i+1]-T_0[i+1]=P$ $T_2[i+1]-T_1[i+1]=P-Q$

In each case, the process proceeds to step S228.

Figure 7:
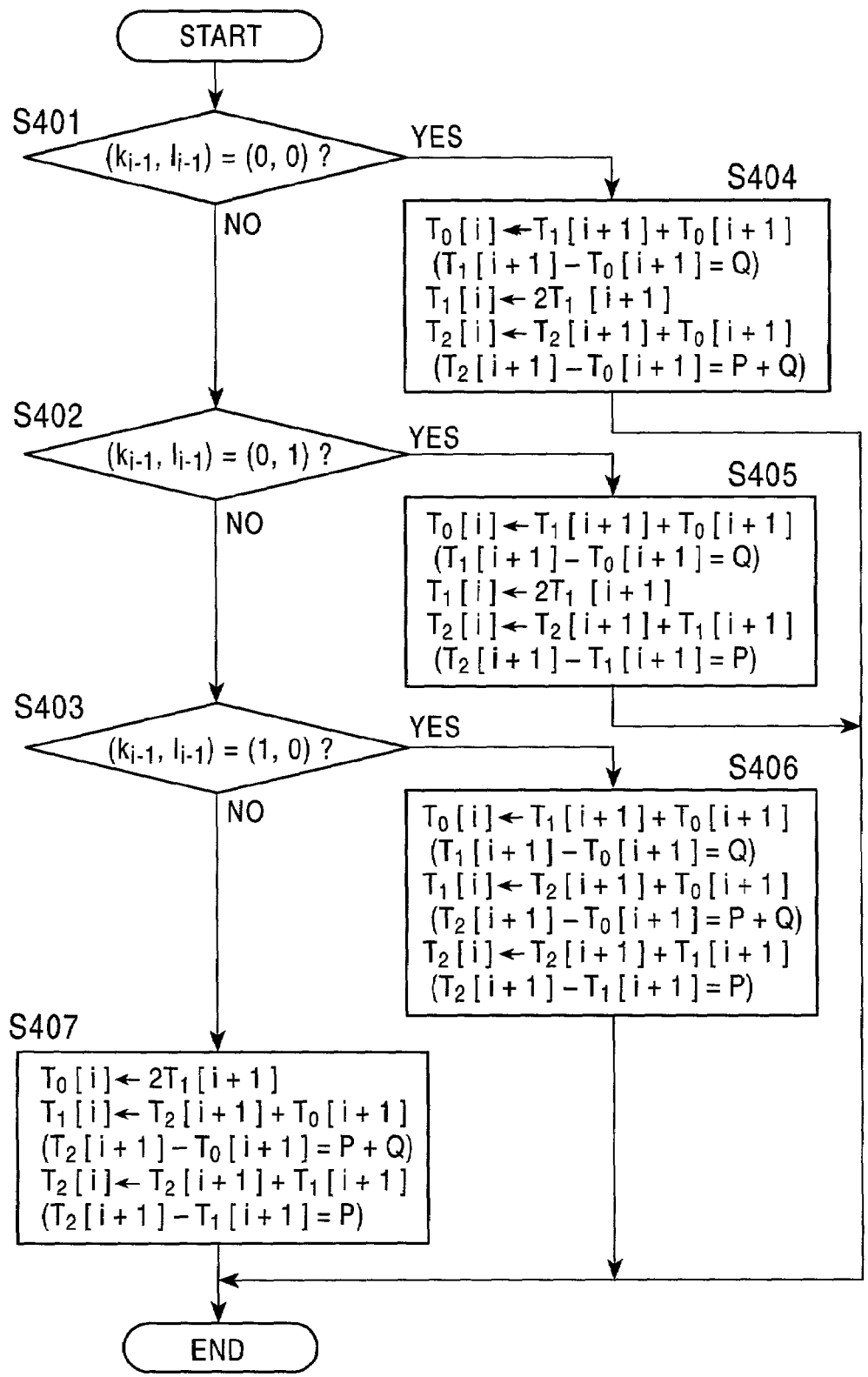
FIG. 7 shows a process flowchart in the case of ($k_i$, $l_i$)=(0, 1) in a scalar multiplication process using three points on an elliptic curve.

When it is determined in step S222 that $(k_i, l_i)=(0, 1)$, the process of step S225 is performed. The detailed flowchart of the process of step S225 is shown in FIG. 7.

When it is determined in step S401 that $(k_{i-1}, l_{i-1})=(0, 0)$, in step S404, the following substitutions are performed on the basis of equation (13) described above:

$T_0[i]=T_1[i+1]+T_0[i+1]$ $T_1[i]=2T_1[i+1]$ $T_2[i]=T_2[i+1]+T_0[i+1]$ and $G'_i$ is computed from $G'_{i+1}$.

When it is determined in step S402 that $(k_{i-1}, l_{i-1})=(0, 1)$, in step S405, the following substitutions are performed on the basis of equation (14) described above:

$T_0[i]=T_1[i+1]+T_0[i+1]$ $T_1[i]=2T_1[i+1]$ $T_2[i]=T_2[i+1]+T_1[i+1]$ and $G'_i$ is computed from $G'_{i+1}$.

When it is determined in step S403 that $(k_{i-1}, l_{i-1})=(1, 0)$, in step S406, the following substitutions are performed on the basis of equation (15) described above:

$T_0[i]=T_1[i+1]+T_0[i+1]$ $T_1[i]=T_2[i+1]+T_0[i+1]$ $T_2[i]=T_2[i+1]+T_1[i+1]$ and $G'_i$ is computed from $G'_{i+1}$.

When the determination is "No" in steps S401 to S403, that is, when it is determined that $(k_{i-1}, l_{i-1})=(1, 1)$, in step S407, the following substitutions are performed on the basis of equation (16) described above:

$T_0[i]=2T_1[i+1]$ $T_1[i]=T_2[i+1]+T_0[i+1]$ $T_2[i]=T_2[i+1]+T_1[i+1]$ and $G'_i$ is computed from $G'_{i+1}$.

In steps S404 to S407, the difference points required for the addition of points become as follows:

$T_1[i+1]-T_0[i+1]=Q$ $T_2[i+1]-T_0[i+1]=P+A$ $T_2[i+1]-T_1[i+1]=P$

In each case, the process proceeds to step S228.

When it is determined in step S223 that $(k_i, l_i)=(1, 0)$, the process of step S226 is performed. The detailed flowchart of the process of step S226 is shown in FIG. 8.

Figure 8:
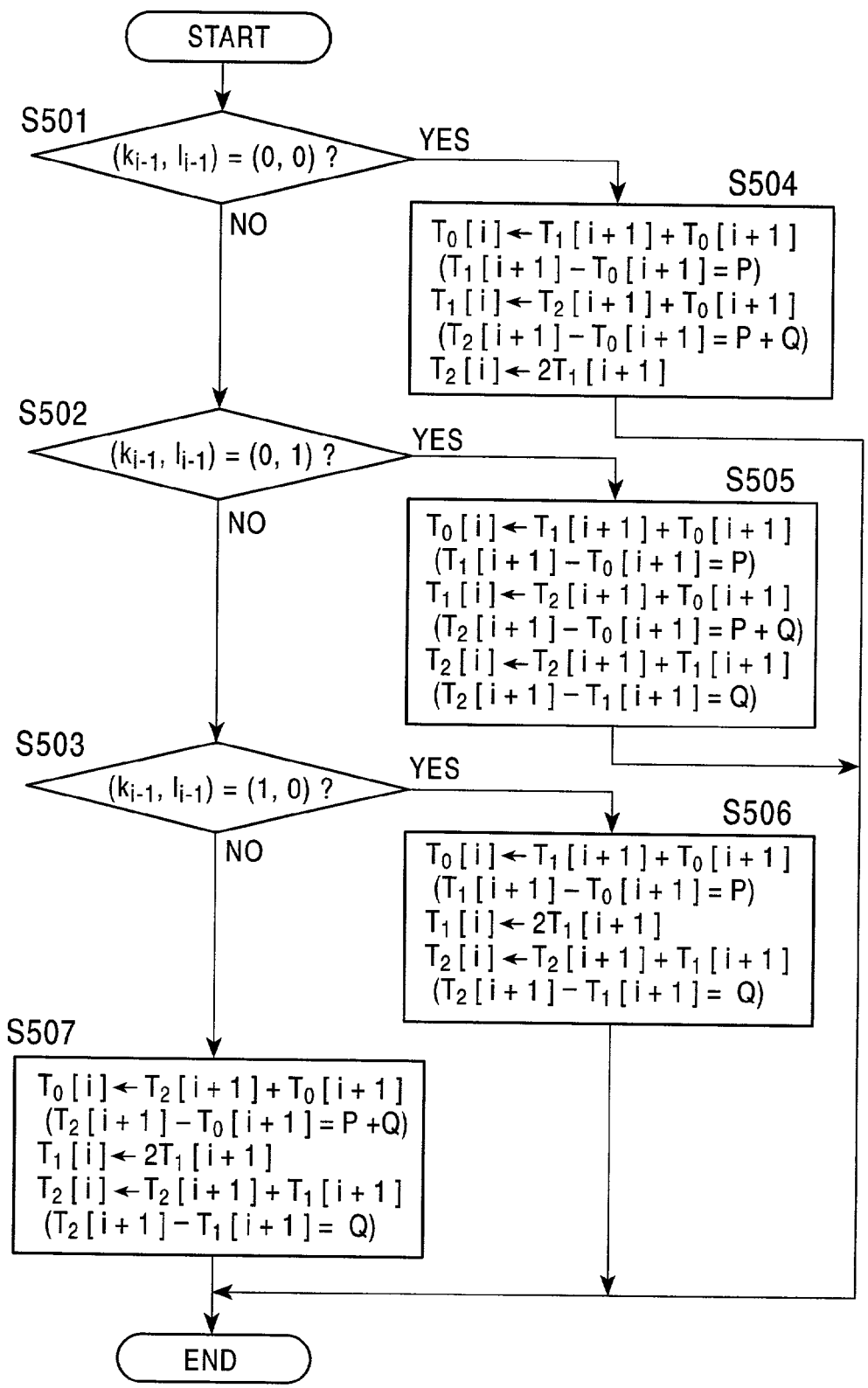
FIG. 8 shows a process flowchart in the case of ($k_i$, $l_i$)=(1, 0) in a scalar multiplication process using three points on an elliptic curve.

When it is determined in step S501 in FIG. 8 that $(k_{i-1}, l_{i-1})=(0, 0)$, in step S504, the following substitutions are performed on the basis of equation (17) described above:

$T_0[i]=T_1[i+1]+T_0[i+1]$ $T_1[i]=T_2[i+1]+T_0[i+1]$ $T_2[i]=2T_1[i+1]$ and $G'_i$ is computed from $G'_{i+1}$.

When it is determined in step S502 that $(k_{i-1}, l_{i-1})=(0, 1)$, in step S505, the following substitutions are performed on the basis of equation (18) described above:

$T_0[i]=T_1[i+1]+T_0[i+1]$ $T_1[i]=T_2[i+1]+T_1[i+1]$ $T_2[i]=T_2[i+1]+T_1[i+1]$ and $G'_i$ is computed from $G'_{i+1}$.

When it is determined in step S503 that $(k_{i-1}, l_{i-1})=(0, 1)$, in step S506, the following substitutions are performed on the basis of equation (19) described above:

$T_0[i]=T_1[i+1]+T_0[i+1]$ $T_1[i]=2T_1[i+1]$ $T_2[i]=T_2[i+1]+T_1[i+1]$ and $G'_i$ is computed from $G'_{i+1}$.

When the determination is "No" in steps S501 to S503, that is, when it is determined that $(k_{i-1}, l_{i-1})=(1, 1)$, in step S507, the following substitutions are performed on the basis of equation (20) described above:

$T_0[i]=T_1[i+1]+T_0[i+1]$ $T_1[i]=2T_1[i+1]$ $T_2[i]=T_2[i+1]+T_1[i+1]$ and $G'_i$ is computed from $G'_{i+1}$.

In steps S504 to S507, the difference points required for the addition of points become as follows:

$$T_1[i+1]-T_0[i+1]=P$$

$$T_2[i+1]-T_0[i+1]=P+Q$$

$$T_2[i+1]-T_1[i+1]=Q$$

In each case, the process proceeds to step S228.

Figure 9:
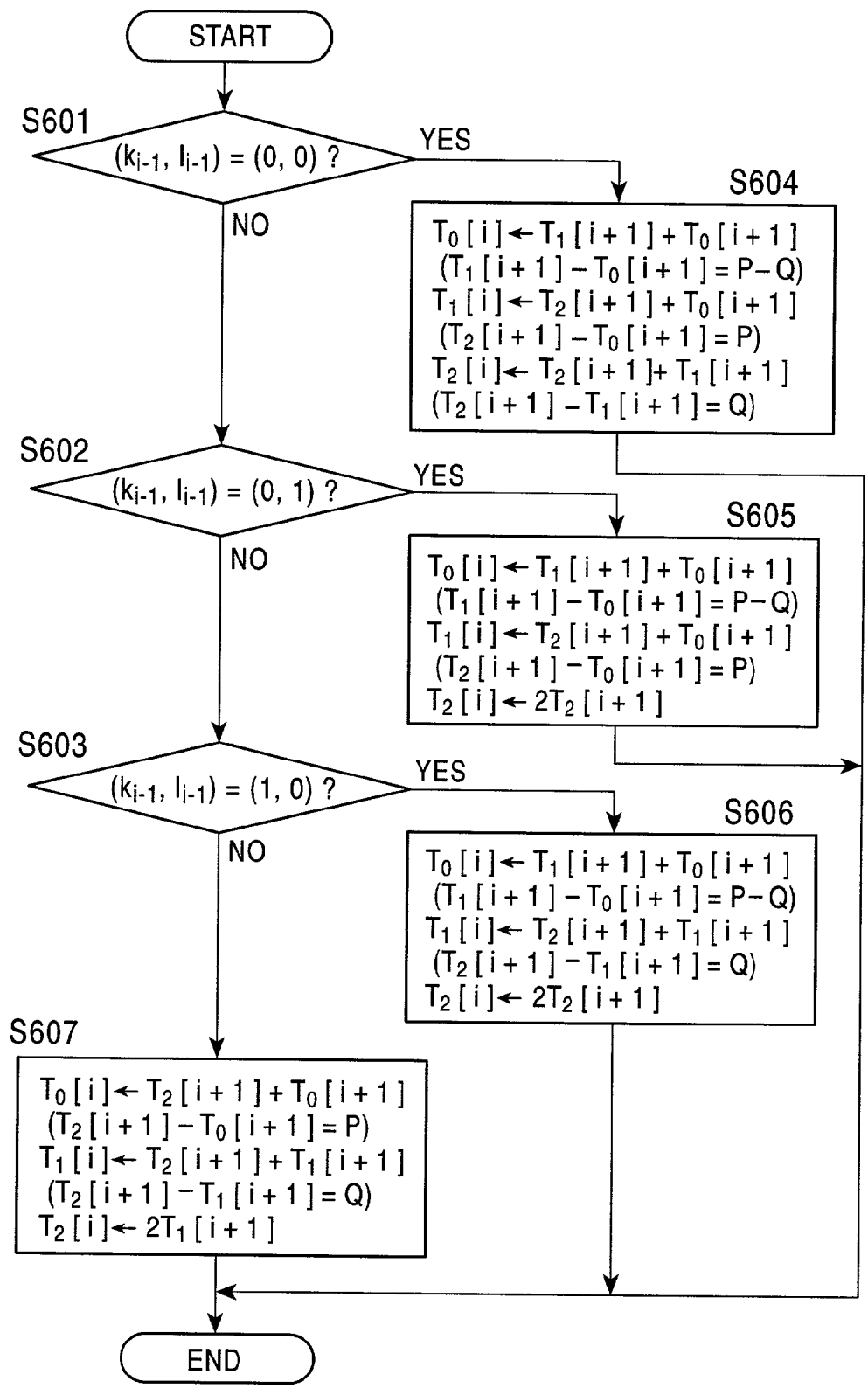
FIG. 9 shows a process flowchart in the case of ($k_i$, $l_i$)=(1, 1) in a scalar multiplication process using three points on an elliptic curve.

When the determination is "No" in steps S221 to S223, that is, when it is determined that $(k_i, l_i)=(1, 1)$, the process of step S227 is performed. The detailed flowchart of the process of step S227 is shown in FIG. 9.

When it is determined in step S601 that $(k_{i-1}, l_{i-1})=(0, 0)$, in step S604, the following substitutions are performed on the basis of equation (21) described above:

$$T_0[i]=T_1[i+1]+T_0[i+1]$$

$$T_1[i]=T_2[i+1]+T_0[i+1]$$

$$T_2[i]=T_2[i+1]+T_1[i+1]$$

and $G'_i$ is computed from $G'_{i+1}$.

When it is determined in step S602 that $(k_{i-1}, l_{i-1})=(0, 1)$, in step S605, the following substitutions are performed on the basis of equation (22) described above:

$$T_0[i]=T_1[i+1]+T_0[i+1]$$

$$T_1[i]=T_2[i+1]+T_0[i+1]$$

$$T_2[i]=2T_2[i+1]$$

and $G'_i$ is computed from $G'_{i+1}$.

When it is determined in step S603 that $(k_{i-1}, l_{i-1})=(1, 0)$, in step S606, the following substitutions are performed on the basis of equation (23) described above:

$$T_0[i]=T_1[i+1]+T_0[i+1]$$

$$T_1[i]=T_2[i+1]+T_1[i+1]$$

$$T_2[i]=2T_2[i+1]$$

and $G'_i$ is computed from $G'_{i+1}$.

When the determination is "No" in steps S601 to S603, that is, when it is determined that $(k_{i-1}, l_{i-1})=(1, 1)$, in step S607, the following substitutions are performed on the basis of equation (24) described above:

$$T_0[i]=T_2[i+1]+T_0[i+1]$$

$$T_1[i]=T_2[i+1]+T_1[i+1]$$

$$T_2[i]=2T_2[i+1]$$

and $G_i$ is calculated from $G_{i+1}$.

In steps S604 to S607, the difference points required for the addition of points become as follows:

$$T_1[i+1]-T_0[i+1]=P-Q$$

$$T_2[i+1]-T_0[i+1]=P$$

$$T_2[i+1]-T_1[i+1]=Q$$

In each case, the process proceeds to step S228.

In step S228, i−1 is substituted into i, and in step S229, a check is made to determine whether or not i≧0. When i≧0, the process returns to step S221, where the same processes are repeatedly performed.

When the determination of i>0 is "No" in step S229, it follows that $G'_1$ is computed, and the process proceeds to step S230.

In steps S230 to S236, W is determined from $G'_1$. W is one of the three points which form the $G'_0$, and corresponds to $kP+lQ$.

When it is determined in step S230 that $(k_0, l_0)=(0, 0)$, the following is satisfied:

$$T_0[1]=m_1P+n_1Q, \text{ and}$$

$$k=m_0=2m_1$$

$$l=n_0=2n_1.$$

Therefore, in step S233, $2T_0[1]$ is substituted into W ($W=2T_0[1]$), and then the processing is terminated.

When it is determined in step S231 that $(k_0, l_0)=(0, 1)$, the following are satisfied:

$$T_0[1]=m_1P+n_1Q$$

$$T_1[1]=m_1P+(n_1+1)Q, \text{ and}$$

$$k=m_0=2m_1$$

$$l=n_0=2n_1+1.$$

Therefore, in step S234, $T_1[1]+T_0[1]$ is substituted into W ($W=T_1[1]+T_0[1]$), and then the processing is terminated. At this time, the difference point required for the addition of points is $T_1[1]-T_0[1]=Q$.

When it is determined in step S232 that $(k_0, l_0)=(1, 0)$, the following are satisfied:

$$T_0[1]=m_1P+n_1Q$$

$$T_1[1]=(m_1+1)P+n_1Q, \text{ and}$$

$$k=m_0=2m_1+1$$

$$l=n_0=2n_1.$$

Therefore, in step S235, $T_1[1]+T_0[1]$ is substituted into W ($W=T_1[1]+T_0[1]$), and then the processing is terminated. At this time, the difference point required for the addition of points is $T_1[1]-T_0[1]=P$.

When the determination in steps S230 to S232 is "No", that is, when it is determined that $(k_0, l_0)=(1, 1)$, the following are satisfied:

$$T_0[1]=m_1P+(n_1+1)Q$$

$$T_1[1]=(m_1+1)P+n_1Q, \text{ and}$$

$$k=m_0=2m_1+1$$

$$l=n_0=2n_1+1.$$

Therefore, in step S236, $T_1[1]+T_0[1]$ is substituted into W ($W=T_1[1]+T_0[1]$), and then the processing is terminated. At this time, the difference point required for the addition of points is $T_1[1]+T_0[1]=P-Q$.

As has thus been described, in the construction of the present invention, a set $G'_i$ of three points on an elliptic curve is defined and the scalar multiplication $kP+lQ$ is performed, and thus the results can be output at high speed.

Both the first embodiment and the second embodiment can be carried out on a Montgomery elliptic curve on a prime field and on elliptic curves on two extension fields, and can be carried out in both an affine coordinate system and a projective coordinate system.

[Example of System Configuration]

Figure 10:
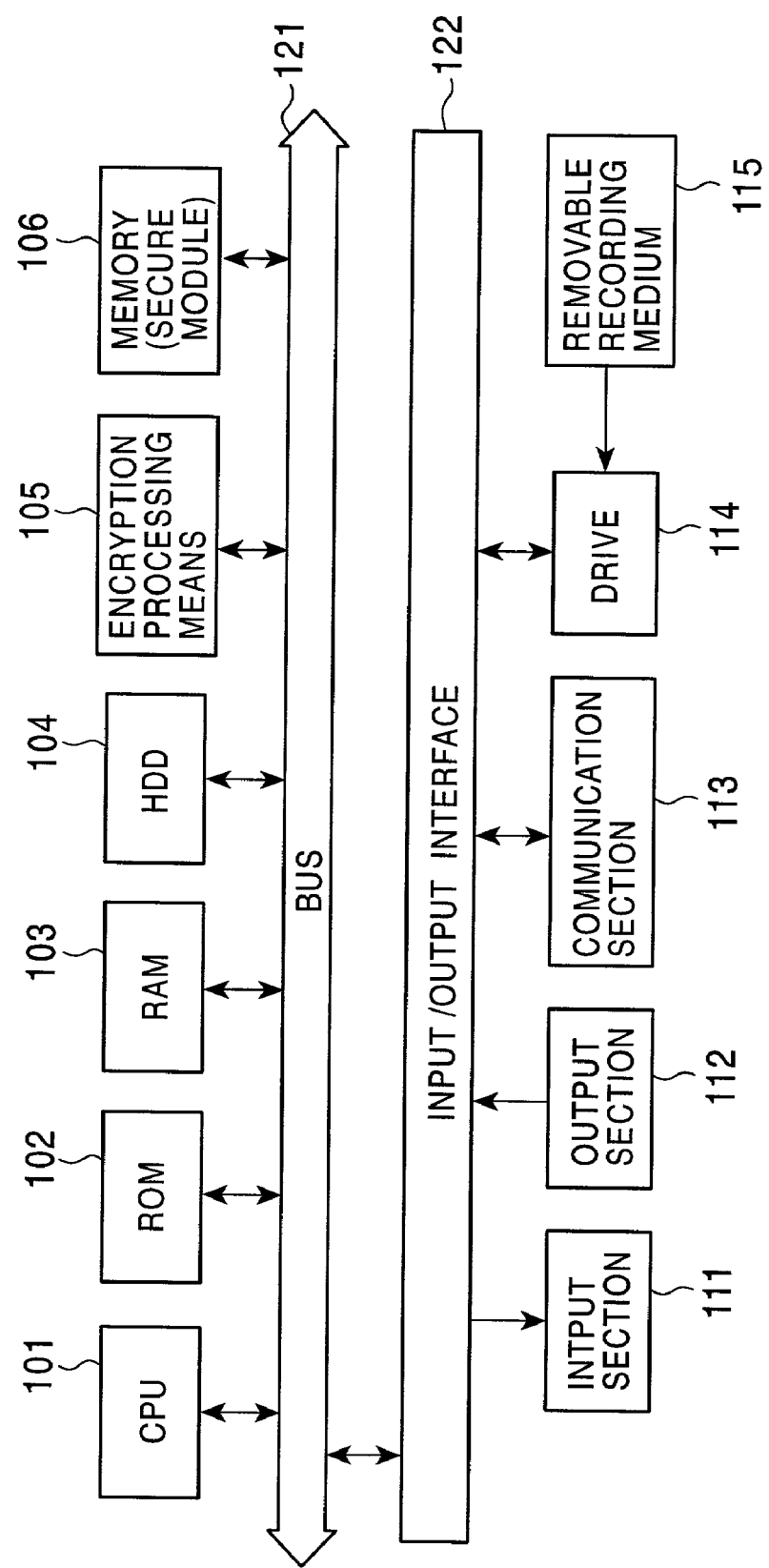
FIG. 10 shows an example of the system configuration which performs a simultaneous elliptic curve scalar multiplication process.

The series of processes described in the embodiments above can be performed by a combination of hardware and software. That is, the construction may be formed in such a way that the processes are performed by causing a general-purpose computer or a microcomputer to execute a program. When the series of processes is to be performed by software, the program which forms the software is installed in, for example, a general-purpose computer, a one-chip microcomputer, etc. FIG. 10 shows an example of the configuration of an embodiment of a computer in which the program which executes the above-described series of processes is installed.

The example of the system configuration shown in FIG. 10 is one example, and the system is not necessarily required to have all the functions shown here. A CPU (Central Processing Unit) 101 shown in FIG. 10 is a processor which executes various application programs and the OS (Operating System). A ROM (Read Only Memory) 102 has stored therein programs to be executed by the CPU 101 and/or fixed data as computation parameters. A RAM (Random Access Memory) 103 is used as a storage area or a work area for programs executed in the processor of the CPU 101 and for parameters which change appropriately in the program process.

A hard disk drive (HDD) 104 performs control of hard disks and performs a process of storing and reading various types of data and programs into and from the hard disks. Encryption processing means 105 performs an encryption/decryption process on transmission data, etc. Here, although an example in which the encryption processing means is formed as an individual module is described, the construction may be formed in such a way that an independent encryption processing module is not provided, and, for example, an encryption processing program is stored in the ROM 102, and the CPU 101 reads and executes the program stored in the ROM. A memory (secure module) 106 is formed as a memory, for example, having a tamper-proof structure, so that it can be used as a storage area for key data required for encryption processing and for an access permit. These pieces of data can also be stored in another memory area and storage medium.

A bus 121 is formed of a PCI (Peripheral Component Interconnect) bus, etc., and allows data transfer with each input device via each module and an input/output interface 122.

An input section 111 is formed of, for example, a keyboard and a pointing device, and is operated to input various commands and data to the CPU 101 by a user. An output section 112 is, for example, a CRT or a liquid-crystal display, and displays various types of information in the form of text, images, etc.

A communication section 113 performs a communication process with an entity connected to the system, for example, a communication entity of encrypted data. The communication section 113 performs a process of transmitting data supplied from each storage section, data processed by the CPU 101, encrypted data, etc., or a process of receiving data from another entity, under the control of the CPU 101.

A drive 114 performs recording into and reproduction from a removable recording medium 115, such as a floppy disk, a CD-ROM (Compact Disk-Read Only Memory), an MO (Magneto-optical) disk, a DVD (Digital Versatile Disk), a magnetic disk, or a semiconductor memory. The drive 114 performs reproduction of a program and/or data from each removable recording medium 115, and performs storage of a program and/or data into the removable recording medium 115.

When a program and/or data recorded in each recording medium is to be read and the program is executed or the data is processed by the CPU 101, the read program and/or data are supplied to, for example, the connected RAM 103 via the interface 122 and the bus 121.

The program for executing an elliptic curve processing computation contained in the above description, referring to each flowchart, is, for example, stored in the ROM 102 and is executed by the CPU 101, or is stored in a hard disk and is supplied via a HDD 104 to the CPU 101, whereby the program is executed.

Figure 11:
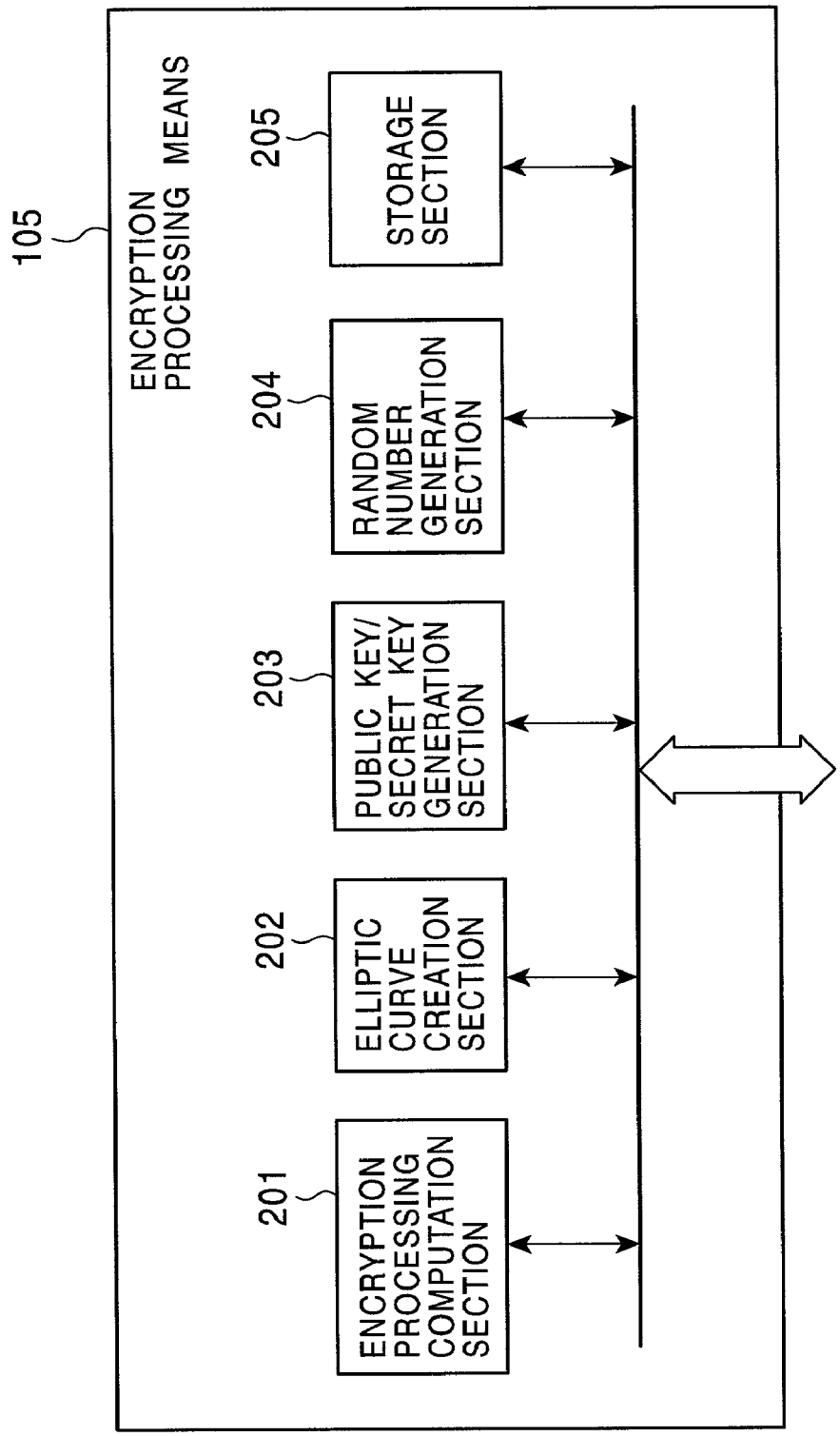
FIG. 11 shows an example of the construction of encryption processing means which performs a simultaneous elliptic curve scalar multiplication process.

FIG. 11 shows the encryption processing means 105 shown in FIG. 10 as detailed processing blocks according to function. As shown in FIG. 11, the encryption processing means 105 comprises an encryption process computation section 201 for performing computations associated with various encryption processes, such as a data encryption process, a data decryption process, signature processing, and signature verification; an elliptic curve creation section 202 for performing a process of creating an elliptic curve; a public key/secret key generation section 203 for performing a process of generating a public key and a secret key used in a public key encryption method; a random number generation section 204 for generating a random number used for key generation and other various computations; and a storage section 205 for storing various parameters used in encryption process computations, etc.

For example, when encryption of plain text which is input from the outside, decryption of cyphertext, creation of a signature, a signature verification process, etc., are to be performed, the elliptic curve creation section 202 first creates an elliptic curve, and the encryption processing computation section 201 performs various encryption processes by using the key generated in the public key/secret key generation section 203.

For example, the elliptic curve creation section 202 performs a process of creating a Montgomery elliptic curve EM (GF(p)) represented by $By^2=x^3+Ax^2+x$. The encryption processing computation section 201 performs the above-described scalar multiplication process on the basis of the elliptic curve created by the elliptic curve creation section 202. More specifically, the encryption processing computation section 201 performs a computation process which converts the Montgomery elliptic curve $E^M$ (GF(p)) represented by $By^2=x^3+Ax^2+x$ into projective coordinates (X, Y, Z), defines a set $G_i$ of four points such that $G_i$ can be computed from $G_{i+1}$ in the projective coordinates (X, Y, Z), defines, on the basis of $G_i$, a set $G'_i$ of three points such that $G'_i$ can be computed from $G'_{i+1}$, sets an initial value $G'_{i+1}$ by setting $m_{i+1}=0$ and $n_{i+1}=0$, calculates $G'_i$ according to $(k_i, l_i, k_{i-1}, l_{i-1})$ in order to compute $G'_1$, and determines kP+lQ on the basis of $G'_1$.

The series of processes described in the specification can be performed by hardware, software, or a combination thereof. When the processes are to be performed by software, a program in which a process sequence is recorded may be installed into a memory inside a computer incorporated into dedicated hardware so that the processes are executed, or a program may be installed into a general-purpose computer capable of performing various processes so that the processes are executed.

For example, a program can be prerecorded in a hard disk and a ROM (Read Only Memory), as the recording medium.

Alternatively, a program can be prestored (prerecorded) temporarily or permanently in a removable recording medium, such as a floppy disk, a CD-ROM, an MO disk, a DVD, a magnetic disk, or a semiconductor memory. Such a removable recording medium can be provided as so-called packaged software.

In addition to being installed into a computer from a removable recording medium such as that described above, programs may be transferred in a wireless manner from a download site to a computer or may be transferred by wire to a computer via a network, such as a LAN (Local Area Network) or the Internet, and in the computer, the programs which are transferred in such a manner may be received and installed into a recording medium, such as a hard disk, contained therein.

The various processes described in this specification may be performed not only in a time-series manner along the described sequence, but also may be performed in parallel or individually according to the processing performance of the device which performs processing or according to necessity. Furthermore, the system in this specification is a logical assembly of a plurality of devices, and the individual devices do not necessarily exist in the same housing.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An elliptic curve encryption processing method for encrypting and/or decrypting data using a Montgomery elliptic curve $By^2=x^3+Ax^2+x$ on a prime field, said elliptic curve encryption processing method comprising:

computing simultaneously in the computation of kP+lQ a point kP which is a scalar quantity k times as great as a point P on said Montgomery elliptic curve and a point lQ which is a scalar quantity l times as great as a point Q on said Montgomery elliptic curve, said computing including:

(i) an initial point computation step of calculating a set $G_{t+1}$ of four initial points on the basis of said point P and said point Q;

(ii) a bit value detection step of detecting a combination of each bit value of k and l of binary representation data of said scalar quantities k and l; and (iii) an iterative computation process step of selecting a computation relation of a set $G_t$ of the next four points based on said set $G_{t+1}$ of four initial points according to a combination of each bit value of said binary representation data of k and l detected in said bit value detection step and performing a computation process of the next four points in accordance with said computation relation of said set $G_t$, and selecting a computation relation of a set $G_i$ of the next four points based on a set $G_{i+1}$ of the four computed points and repeatedly performing a computation process of the next four points according to the number of bits of k or l of said binary representation data in accordance with said computation relation of said set $G_i$;

in which, when the high-order bit values of the high orders t to i when each bit of said binary representation data of k and l is k: $(k_t \ldots k_o)_2$ and l: $(l_t \ldots l_o)_2$ are $m_i=(k_t \ldots k_i)_2$ and $n_i=(l_t \ldots l_i)_2$, said set $G_i$ of four points is formed of the four points which are indicated in the expressions below by using said point P and said point Q:

$m_i P + n_i Q$ $m_i P + (n_i+1)Q$ $(m_i+1)P + n_i Q$ $(m_i+1)P + (n_i+1)Q$, and said iterative computation process step includes computing said set $G_i$ of the next four points repeatedly on the basis of said set $G_{i+1}$ of the four computed points in order to eventually compute a set $G_0$ of four points, and in which one point which is a constituent of said set $G_0$ of four points is computed as W=kP+lQ; and encrypting and/or decrypting the data using the computing results.

2. An elliptic curve encryption processing method according to claim 1, in which said initial points are set as the four points shown below which are computed on the basis of said expressions on the basis of $m_{t+1}=k_{t+1}=0$ and $n_{t+1}=l_{t+1}=0$ by setting i=t+1:

$T_0[t+1]=O$ (point at infinity)

$T_1[t+1]=Q$ $T_2[t+1]=P$ $T_3[t+1]=P+Q$.

3. An elliptic curve encryption processing method for encrypting and/or decrypting data using a Montgomery elliptic curve $By^2=x^3+Ax^2+x$ on a prime field, said elliptic curve encryption processing method comprising:

computing simultaneously in the computation of kP+lQ a point kP which is a scalar quantity k times as great as a point P on said Montgomery elliptic curve and a point lQ which is a scalar quantity l times as great as a point Q on said Montgomery elliptic curve, said computing including:

(i) a bit value detection step of detecting a combination of each bit value of k and l of binary representation data of said scalar quantities k and l;

(ii) an initial point computation step of computing a set $G'_{t+1}$ of three initial points on the basis of a combination of the highest-order bit value $(k_t, l_t)$ of k and l of said binary representation data of said scalar quantities k and l; and (iii) an iterative computation process step of selecting a computation relation of a set $G'_t$ of the next three points based on said set $G'_{t+i}$ of three initial points according to a combination of each bit value of said binary representation data of k and l detected in said bit value detection step and performing a computation process of the next three points in accordance with said computation relation of said set $G'_t$, and selecting a computation relation of a set $G'_i$ of the next three points based on a set $G'_{i+1}$ of the three computed points and repeatedly performing a computation process of the next three points according to the number of bits of k or l of said binary representation data in accordance with said computation relation of said set $G'_i$;

in which when the high-order bit values of the high orders t to i when each bit of said binary representation data of k and l are k: $(k_t \ldots k_o)_2$ and l: $(l_t \ldots l_o)_2$ are $m_i=(k_t \ldots$ $k_i)_2$ and $n_i=(l_t \ldots l_i)_2$, said set $G'_i$ of three points is formed of the three points which are selected on the basis of a combination of the high-order bit value $(k_t, l_t)$ of k and l of said binary representation data indicated in the expressions below by using said point P and said point Q:

$m_iP+n_iQ$ $m_iP+(n_i+1)Q$ $(m_i+1)P+n_iQ$ $(m_i+1)P+(n_i+1)Q$, and said iterative computation process step includes computing said set $G'_i$ of the next three points from said set $G'_{i+1}$ of the three computed points repeatedly to eventually compute a set $G'_1$ of three points, and $W=kP+lQ$ is computed from said set $G'_1$ of three points; and encrypting and/or decrypting the data using the computing results.

4. An elliptic curve encryption processing method according to claim 3, wherein, when the high-order bit values of the high orders t to i when each bit of said binary representation data of k and l are k: $(k_t \ldots k_o)_2$ and l: $(l_t \ldots l_o)_2$ are $m_i=(k_t \ldots k_i)_2$ and $n_i=(l_t \ldots l_i)_2$, said set $G'_i$ of three points is formed of the three points which are selected on the basis of a combination of the bit value $(k_{i-1}, l_{i-1})$ of k and l of said binary representation data from the following four points indicated in the expression below by using said point P and said point Q:

$m_iP+n_iQ$ $m_iP+(n_i+1)Q$ $(m_i+1)P+n_iQ$ $(m_i+1)P+(n_i+1)Q$, and said initial points are set as the three points which are selected on the basis of a combination of the highest-order bit value $(k_t, l_t)$ of k and l of said binary representation data from the following four points:

$T_0[t+1]=O$ (point at infinity)

$T_1[t+1]=Q$ $T_2[t+1]=P$ $T_3[t+1]=P+A$ which are the four points computed based on the above relations from $m_{t+1}=k_{t+1}=0$ and $n_{t+1}=l_{t+1}=0$ by setting i=t+1.

5. An elliptic curve encryption processing method for encrypting and/or decrypting data using an elliptic curve $y^2+xy=x^3+ax^2+b$ on two extension fields, said elliptic curve encryption processing method comprising:

computing simultaneously in the computation of kP+lQ a point kP which is a scalar quantity k times as great as a point P on said elliptic curve and a point lQ which is a scalar quantity l times as great as a point Q on said elliptic curve, said computing including:

(i) an initial point computation step of calculating a set $G_{t+1}$ of four initial points on the basis of said point P and said point Q;

(ii) a bit value detection step of detecting a combination of each bit value of k and l of binary representation data of said scalar quantities k and l; and (iii) an iterative computation process step of selecting a computation relation of a set $G_t$ of the next four points based on said set $G_{t+1}$ of four initial points according to a combination of each bit value of said binary representation data of k and l detected in said bit value detection step and performing a computation process of the next four points in accordance with said computation relation of said set $G_t$, and selecting a computation relation of a set $G_i$ of the next four points based on a set $G_{i+1}$ of the four computed points and repeatedly performing a computation process of the next four points according to the number of bits of k or l of said binary representation data in accordance with said computation relation of said set $G_i$;

in which when the high-order bit values of the high orders t to i when each bit of said binary representation data of k and l is k: $(k_t \ldots k_o)_2$ and l: $(l_t \ldots l_o)_2$ are $m_i=(k_t \ldots k_i)_2$ and $n_i=(l_t \ldots l_i)_2$, said set $G_i$ of four points is formed of the four points which are indicated in the expressions below by using said point P and said point Q:

$m_iP+n_iQ$ $m_iP+(n_i+1)Q$ $(m_i+1)P+n_iQ$ $(m_i+1)P+(n_i+1)Q$, and said iterative computation process step includes computing said set $G_i$ of the next four points repeatedly on the basis of said set $G_{i+1}$ of the four computed points in order to eventually compute a set $G_0$ of four points, and in which one point which is a constituent of said set $G_0$ of four points is computed as $W=kP+lQ$; and encrypting and/or decrypting the data using the computing results.

6. An elliptic curve encryption processing method according to claim 5, in which said initial points are set as the four points shown below which are computed on the basis of said expressions on the basis of $m_{t+1}=k_{t+1}=0$ and $n_{t+1}=l_{t+1}=0$ by setting i=t+1:

$T_0[t+1]=O$ (point at infinity)

$T_1[t+1]=Q$ $T_2[t+1]=P$ $T_3[t+1]=P+Q$.

7. An elliptic curve encryption processing method for encrypting and/or decrypting data using an elliptic curve $y^2+xy=x^3+ax^2+b$ on two extension fields, said elliptic curve encryption processing method comprising:

computing simultaneously in the computation of kP+lQ a point kP which is a scalar quantity k times as great as a point P on said elliptic curve and a point lQ which is a scalar quantity l times as great as a point Q on said elliptic curve, said computing including:

(i) a bit value detection step of detecting a combination of each bit value of k and l of binary representation data of said scalar quantities k and l;

(ii) an initial point computation step of computing a set $G'_{t+1}$ of three initial points on the basis of a combination of the highest-order bit value $(k_t, l_t)$ of k and l of said binary representation data of said scalar quantities k and l by using said point P and said point Q; and (iii) an iterative computation process step of selecting a computation relation of a set $G'_i$ of the next three points based on said set $G'_{i+1}$ of three initial points according to a combination of each bit value of said binary representation data of k and l detected in said bit value detection step and performing a computation process of the next three points in accordance with said computation relation of said set $G'_i$, and selecting a computation relation of a set $G'_i$ of the next three points based on a set $G'_{i+1}$ of the three computed points and repeatedly performing a computation process of the next three points according to the number of bits of k or l of said binary representation data in accordance with said computation relation of said set $G'_i$;

in which when the high-order bit values of the high orders t to i when each bit of said binary representation data of k and l is k: $(k_t \ldots k_o)_2$ and l: $(l_t \ldots l_o)_2$ are $m_i = (k_t \ldots k_i)_2$ and $n_i = (l_t \ldots l_i)_2$ said set $G'_i$ of three points is formed of the three points which are selected on the basis of a combination of the bit values $(k_{i-1}, l_{i-1})$ of k and l of said binary representation data from the four points indicated in the expressions below by using said point P and said point Q:

$m_iP + n_iQ$ $m_iP + (n_i+1)Q$ $(m_i+1)P + n_iQ$ $(m_i+1)P + (n_i+1)Q$, and said iterative computation process step includes computing said set $G'_i$ of the next three points on the basis of said set $G'_{i+1}$ of the three computed points repeatedly to eventually compute a set $G'_1$ of three points, and in which $W = kP + lQ$ is computed from said set $G'_1$ of three points; and encrypting and/or decrypting the data using the computing results.

8. An elliptic curve encryption processing method according to claim 7, in which, said initial points are set as the three points which are selected on the basis of a combination of the highest-order bit value $(k_t, l_t)$ of k and l of said binary representation data from the four points shown below which are computed on the basis of the above expressions on the basis of $m_{t+1} = k_{t+1} = 0$ and $n_{t+1} = l_{t+1} = 0$ by setting $i = t+1$:

$T_0[t+1] = O$ (point at infinity)

$T_1[t+1] = Q$ $T_2[t+1] = P$ $T_3[t+1] = P + Q$.

9. An elliptic curve encryption processing apparatus for encrypting and/or decrypting data using a Montgomery elliptic curve $By^2 = x^3 + Ax^2 + x$ on a prime field, said elliptic curve encryption processing apparatus comprising:

a computation processor operable to compute $kP + lQ$ by simultaneously computing a point $kP$ which is a scalar quantity k times as great as a point P on said Montgomery elliptic curve and a point $lQ$ which is a scalar quantity l times as great as a point Q on said Montgomery elliptic curve, wherein said computation processor performs:

an initial point computation process of calculating a set $G_{t+1}$ of four initial points on the basis of said point P and said point Q;

a bit value detection process of detecting a combination of each bit value of k and l of binary representation data of said scalar quantities k and l; and an iterative computation process of selecting a computation relation of a set $G_i$ of the next four points based on said set $G_{i+1}$ of four initial points according to a combination of each bit value of said binary representation data of k and l detected in said bit value detection process and performing a computation process of the next four points in accordance with said computation relation of said set $G_i$, and selecting a computation relation of a set $G_i$ of the next four points based on a set $G_{i+1}$ of the four computed points and repeatedly performing a computation process of the next four points according to the number of bits of k or l of said binary representation data in accordance with said computation relation of said set $G_i$, in which when the high-order bit values of the high orders t to i when each bit of said binary representation data of k and l is k: $(k_t \ldots k_o)_2$ and l: $(l_t \ldots l_o)_2$ are $m_i = (k_t \ldots k_i)_2$ and $n_i = (l_t \ldots l_i)_2$, said set $G_i$ of four points is formed of the four points which are indicated in the expressions below by using said point P and said point Q:

$m_iP + n_iQ$ $m_iP + (n_i+1)Q$ $(m_i+1)P + n_iQ$ $(m_i+1)P = (n_i+1)Q$, and said computation processor is operable to compute said set $G_i$ of the next four points repeatedly on the basis of said set $G_{i+1}$ of the four computed points in order to eventually compute a set $G_0$ of four points, and in which one point which is a constituent of said set $G_0$ of four points is computed as $W = kP + lQ$; and wherein the computational processor is operable to encrypt and/or decrypt the data using the obtained computed results.

10. An elliptic curve encryption processing apparatus according to claim 9, in which said initial points are set as the four points shown below which are computed on the basis of said expressions on the basis of $m_{t+1} = k_{t+1} = 0$ and $n_{t+1} = l_{t+1} = 0$ by setting $i = t+1$:

$T_0[t+1] = O$ (point at infinity)

$T_1[t+1] = Q$ $T_2[t+1] = P$ $T_3[t+1] = P + Q$.

11. An elliptic curve encryption processing apparatus for encrypting and/or decrypting data using a Montgomery elliptic curve $By^2 = x^3 + Ax^2 + x$ on a prime field, said elliptic curve encryption processing apparatus comprising:

a computation processor operable to compute $kP + lQ$ by simultaneously computing a point $kP$ which is a scalar quantity k times as great as a point P on said Montgomery elliptic curve and a point $lQ$ which is a scalar quantity l times as great as a point Q on said Montgomery elliptic curve, wherein said computation processor performs:

a bit value detection process of detecting a combination of each bit value of k and l of binary representation data of said scalar quantities k and l;

an initial point computation process of computing a set $G'_{n+1}$ of three initial points on the basis of a combination of the highest-order bit value ($k_t$, $l_t$) of k and l of said binary representation data of said scalar quantities k and l; and an iterative computation process of selecting a computation relation of a set $G'_t$ of the next three points based on said set $G'_{t+1}$ of three initial points according to a combination of each bit value of said binary representation data of k and l detected in said bit value detection process and performing a computation process of the next three points in accordance with said computation relation of said set $G'_t$, and selecting a computation relation of a set $G'_i$ of the next three points based on a set $G'_{i+1}$ of the three computed points and repeatedly performing a computation process of the next three points according to the number of bits of k or l of said binary representation data in accordance with said computation relation of said set $G'_i$, in which when the high-order bit values of the high orders t to i when each bit of said binary representation data of k and l are k: $(k_t \ldots k_o)_2$ and l: $(l_t \ldots l_o)_2$ are $m_i=(k_t \ldots k_i)_2$ and $n_i=(l_t \ldots l_i)_2$, said set $G'_i$ of three points is formed of the three points which are selected on the basis of a combination of the high-order bit value ($k_t$, $l_t$) of k and l of said binary representation data indicated in the expressions below by using said point P and said point Q:

$m_iP+n_iQ$ $m_iP+(n_i+1)Q$ $(m_i+1)P+n_iQ$ $(m_i+1)P+(n_i+1)Q$, and said computation processor is operable to compute said set $G'_i$ of the next three points from said set $G'_{i+1}$ of the three computed points repeatedly to eventually compute a set $G'_1$ of three points, and in which W=kP+lQ is computed from said set $G'_1$ of three points; and wherein the computational processor is operable to encrypt and/or decrypt the data using the obtained computed results.

12. An elliptic curve encryption processing apparatus according to claim 11, wherein, when the high-order bit values of the high orders t to i when each bit of said binary representation data of k and l are k: $(k_t \ldots k_o)_2$ and l: $(l_t \ldots l_o)_2$ are $m_i=(k_t \ldots k_1)_2$ and $n_i=(l_t \ldots l_1)_2$, said set $G'_i$ of three points is formed of the three points which are selected on the basis of a combination of the bit value ($k_{t-i}$, $l_{t-i}$) of k and l of said binary representation data from the following four points indicated in the expression below by using said point P and said point Q:

$m_iP+n_iQ$ $m_iP+(n_i+1)Q$ $(m_i+1)P+n_iQ$ $(m_i+1)P+(n_i+1)Q$, and said initial points are set as the three points which are selected on the basis of a combination of the highest-order bit value ($k_t$, $l_t$) of k and l of said binary representation data from the following four points:

$T_0[t+1]=O$ (point at infinity)

$T_1[t+1]=Q$ $T_2[t+1]=P$ $T_3[t+1]=P+A$ which are the four points computed based on the above relations from $m_{t+1}=k_{t+1}=0$ and $n_{t+1}=l_{t+1}=0$ by setting i=t+1.

13. An elliptic curve encryption processing apparatus for encrypting and/or decrypting data using an elliptic curve $y^2+xy=x^3+ax^2+b$ on two extension fields, said elliptic curve encryption processing apparatus comprising:

a computation processor operable to compute kP+lQ by simultaneously computing a point kP which is a scalar quantity k times as great as a point P on said elliptic curve and a point lQ which is a scalar quantity l times as great as a point Q on said elliptic curve, wherein said computation processor performs:

an initial point computation process of calculating a set $G_{n+1}$ of four initial points on the basis of said point P and said point Q;

a bit value detection process of detecting a combination of each bit value of k and l of binary representation data of said scalar quantities k and l; and an iterative computation process of selecting a computation relation of a set $G_t$ of the next four points based on said set $G_{t+1}$ of four initial points according to a combination of each bit value of said binary representation data of k and l detected in said bit value detection process and performing a computation process of the next four points in accordance with said computation relation of said set $G_t$, and selecting a computation relation of a set $G_i$ of the next four points based on a set $G_{i+1}$ of the four computed points and repeatedly performing a computation process of the next four points according to the number of bits of k or l of said binary representation data in accordance with said computation relation of said set $G_i$, in which when the high-order bit values of the high orders t to i when each bit of said binary representation data of k and l is k: $(k_t \ldots k_o)_2$ and l: $(l_t \ldots l_o)_2$ are $m_i=(k_t \ldots k_i)_2$ and $n_i=(l_t \ldots l_{i-1})_2$, said set $G_i$ of four points is formed of the four points which are indicated in the expressions below by using said point P and said point Q:

$m_iP+n_iQ$ $m_iP+(n_i+1)Q$ $(m_i+1)P+n_iQ$ $(m_i+1)P+(n_i+1)Q$, and said computation processor is operable to compute said set $G_i$ of the next four points repeatedly on the basis of said set $G_{i+1}$ of the four computed points in order to eventually compute a set $G_0$ of four points, and in which one point which is a constituent of said set $G_0$ of four points is computed as W=kP+lQ; and wherein the computational processor is operable to encrypt and/or decrypt the data using the obtained computed results.

14. An elliptic curve encryption processing apparatus according to claim 13, in which said initial points are set as the four points shown below which are computed on the basis of said expressions on the basis of $m_{t+1}=k_{t+1}=0$ and $n_{t+1}=l_{t+1}=0$ by setting i=t+1:

$T_0[t+1]=O$ (point at infinity)

$T_1[t+1]=Q$ $T_2[t+1]=P$ $T_3[t+1]=P+Q$.

15. An elliptic curve encryption processing apparatus for encrypting and/or decrypting data using an elliptic curve $y^2+xy=x^3+ax^2+b$ on two extension fields, said elliptic curve encryption processing apparatus comprising:

a computation processor operable to compute kP+lQ by simultaneously computing a point kP which is a scalar quantity k times as great as a point P on said elliptic curve and a point lQ which is a scalar quantity l times as great as a point Q on said elliptic curve, wherein said computation processor performs:

a bit value detection process of detecting a combination of each bit value of k and l of binary representation data of said scalar quantities k and l;

an initial point computation process of computing a set $G'_{t+1}$ of three initial points on the basis of a combination of the highest-order bit value $(k_t, l_t)$ of k and l of said binary representation data of said scalar quantities k and l by using said point P and said point Q; and an iterative computation process of selecting a computation relation of a set $G'_t$ of the next three points based on said set $G'_{t+1}$ of three initial points according to a combination of each bit value of said binary representation data of k and l detected in said bit value detection process and performing a computation process of the next three points in accordance with said computation relation of said set $G'_t$, and selecting a computation relation of a set $G'_i$ of the next three points based on a set $G'_{i+1}$ of the three computed points and repeatedly performing a computation process of the next three points according to the number of bits of k or l of said binary representation data in accordance with said computation relation of said set $G'_i$, in which when the high-order bit values of the high orders t to i when each bit of said binary representation data of k and l is k: $(k_t \ldots k_o)_2$ and l: $(l_t \ldots l_o)_2$ are $m_i=(k_t \ldots k_i)_2$ and $n_i=(l_t \ldots l_i)_2$, said set $G'_i$ of three points is formed of the three points which are selected on the basis of a combination of the bit values $(k_{i-1}, l_{i-1})$ of k and l of said binary representation data from the four points indicated in the expressions below by using said point P and said point Q:

$m_iP+n_iQ$ $m_iP+(n_i+1)Q$ $(m_i+1)P+n_iQ$ $(m_i+1)P+(n_i+1)Q$, and said computation processor is operable to compute said set $G'_i$ of the next three points on the basis of said set $G'_{i+1}$ of the three computed points repeatedly to eventually compute a set $G'_I$ of three points, and in which W=kP+lQ is computed from said set $G'_I$ of three points; and wherein the computational processor is operable to encrypt and/or decrypt the data using the obtained computed results.

16. An elliptic curve encryption processing apparatus according to claim 15, in which said initial points are set as the three points which are selected on the basis of a combination of the highest-order bit value $(k_t, l_t)$ of k and l of said binary representation data from the four points shown below which are computed on the basis of the above expressions on the basis of $m_{t+1}=k_{t+1}=0$ and $n_{t+1}=l_{t+1}=0$ by setting i=t+1:

$T_0[t+1]=O$ (point at infinity)

$T_1[t+1]=Q$ $T_2[t+1]=P$ $T_3[t+1]=P+Q$.

17. A recording medium recorded with a program for executing, on a computer system, an elliptic curve encryption process for encrypting and/or decrypting data using a Montgomery elliptic curve $By^2=x^3+Ax^2+x$ on a prime field, said program comprising:

computing simultaneously in the computation of kP+lQ a point kP which is a scalar quantity k times as great as a point P on said Montgomery elliptic curve and a point lQ which is a scalar quantity l times as great as a point Q on said Montgomery elliptic curve, said computing including:

(i) an initial point computation step of calculating a set $G_{t+1}$ of four initial points on the basis of said point P and said point Q;

(ii) a bit value detection step of detecting a combination of each bit value of k and l of binary representation data of said scalar quantities k and l; and (iii) an iterative computation process step of selecting a computation relation of a set $G_t$ of the next four points based on said set $G_{t+1}$ of four initial points according to a combination of each bit value of said binary representation data of k and l detected in said bit value detection step and performing a computation process of the next four points in accordance with said computation relation of said set $G_t$, and selecting a computation relation of a set $G_i$ of the next four points based on a set $G_{i+1}$ of the four computed points and repeatedly performing a computation process of the next four points according to the number of bits of k or l of said binary representation data in accordance with said computation relation of said set $G_i$, in which, when the high-order bit values of the high orders t to i when each bit of said binary representation data of k and l is k: $(k_t \ldots k_o)_2$ and l: $(l_t \ldots l_o)_2$ are $m_i=(k_t \ldots k_i)_2$ and $n_i=(l_t \ldots l_i)_2$, said set $G_i$ of four points is formed of the four points which are indicated in the expressions below by using said point P and said point Q:

$m_iP+n_iQ$ $m_iP+(n_i+1)Q$ $(m_i+1)P+n_iQ$ $(m_i+1)P+(n_i+1)Q$, and said iterative computation process step includes computing said set $G_i$ of the next four points repeatedly on the basis of said set $G_{i+1}$ of the four computed points in order to eventually compute a set $G_0$ of four points, and in which one point which is a constituent of said set $G_0$ of four points is computed as W=kP+lQ; and wherein to obtain computed results are usable to encrypt and/or decrypt the data.

18. A recording medium recorded with a program for executing, on a computer system, an elliptic curve encryption process for encrypting and/or decrypting data using a Montgomery elliptic curve $By^2=x^3+Ax^2+x$ on a prime field, said program comprising:

computing simultaneously in the computation of kP+lQ a point kP which is a scalar quantity k times as great as a point P on said Montgomery elliptic curve and a point lQ which is a scalar quantity l times as great as a point Q on said Montgomery elliptic curve, said computing including:

(i) a bit value detection step of detecting a combination of each bit value of k and l of binary representation data of said scalar quantities k and l;

(ii) an initial point computation step of computing a set $G'_{i+1}$ of three initial points on the basis of a combination of the highest-order bit value $(k_t, l_t)$ of k and l of said binary representation data of said scalar quantities k and l; and (iii) an iterative computation process step of selecting a computation relation of a set $G'_t$ of the next three points based on said set $G'_{t+1}$ of three initial points according to a combination of each bit value of said binary representation data of k and l detected in said bit value detection step and performing a computation process of the next three points in accordance with said computation relation of said set $G'_t$, and selecting a computation relation of a set $G'_i$ of the next three points based on a set $G'_{i+1}$ of the three computed points and repeatedly performing a computation process of the next three points according to the number of bits of k or l of said binary representation data in accordance with said computation relation of said set $G'_t$, in which when the high-order bit values of the high orders t to i when each bit of said binary representation data of k and l are k: $(k_t ... k_o)_2$ and l: $(l_t .. l_o)_2$ are $m_i=(k_t ... k_i)_2$ and $n_i=(l_t ... l_i)_2$, said set $G'_i$ of three points is formed of the three points which are selected on the basis of a combination of the high-order bit value $(k_t, l_t)$ of k and l of said binary representation data indicated in the expressions below by using said point P and said point Q:

$m_iP+n_iQ$ $m_iP+(n_i+1)Q$ $(m_i+1)P+n_iQ$ $(m_i+1)P+(n_i+1)Q$, and said iterative computation process step includes computing said set $G'_i$ of the next three points from said set $G'_{i+1}$ of the three computed points repeatedly to eventually compute a set $G'_l$ of three points, and W=kP+lQ is computed from said set $G'_l$ of three points; and wherein the obtained computed results are usable to encrypt and/or decrypt the data.

19. A recording medium recorded with a program for executing, on a computer system, an elliptic curve encryption process for encrypting and/or decrypting data using an elliptic curve $y^2+xy=x^3+ax^2+b$ on two extension fields, said program comprising:

computing simultaneously in the computation of kP+lQ a point kP which is a scalar quantity k times as great as a point P on said Montgomery elliptic curve and a point lQ which is a scalar quantity l times as great as a point Q on said Montgomery elliptic curve, said computing including:

(i) an initial point computation step of calculating a set $G_{i+1}$ of four initial points on the basis of said point P and said point Q;

(ii) a bit value detection step of detecting a combination of each bit value of k and l of binary representation data of said scalar quantities k and l; and (iii) an iterative computation process step of selecting a computation relation of a set $G_t$ of the next four points based on said set $G_{t+1}$ of four initial points according to a combination of each bit value of said binary representation data of k and l detected in said bit value detection step and performing a computation process of the next four points in accordance with said computation relation of said set $G_t$, and selecting a computation relation of a set $G_i$ of the next four points based on a set $G_{i+1}$ of the four computed points and repeatedly performing a computation process of the next four points according to the number of bits of k or l of said binary representation data in accordance with said computation relation of said set $G_t$, in which when the high-order bit values of the high orders t to i when each bit of said binary representation data of k and l is k: $(k_t ... k_o)_2$ and l: $(l_t ... l_o)_2$ are $m_i=(k_t ... k_i)_2$ and $n_i=(l_t ... l_i)_2$, said set $G_i$ of four points is formed of the four points which are indicated in the expressions below by using said point P and said point Q:

$m_iP+n_iQ$ $m_iP+(n_i+1)Q$ $(m_i+1)P+n_iQ$ $(m_i+1)P+(n_i+1)Q$, and said iterative computation process step includes computing said set $G_i$ of the next four points repeatedly on the basis of said set $G_{i+1}$ of the four computed points in order to eventually compute a set $G_0$ of four points, and in which one point which is a constituent of said set $G_0$ of four points is computed as W=kP+lQ; and wherein the obtained computed results are usable to encrypt and/or decrypt the data.

20. A recording medium recorded with a program for executing, on a computer system, an elliptic curve encryption process for encrypting and/or decrypting data using an elliptic curve $y^2+xy=x^3+ax^2+b$ on two extension fields, said program comprising:

computing simultaneously in the computation of kP+lQ a point kP which is a scalar quantity k times as great as a point P on said Montgomery elliptic curve and a point lQ which is a scalar quantity l times as great as a point Q on said Montgomery elliptic curve, said computing including:

(i) a bit value detection step of detecting a combination of each bit value of k and l of binary representation data of said scalar quantities k and l;

(ii) an initial point computation step of computing a set $G'_{i+1}$ of three initial points on the basis of a combination of the highest-order bit value $(k_t, l_t)$ of k and l of said binary representation data of said scalar quantities k and l by using said point P and said point Q; and (iii) an iterative computation process step of selecting a computation relation of a set $G'_i$ of the next three points based on said set $G'_{i+1}$ of three initial points according to a combination of each bit value of said binary representation data of k and l detected in said bit value detection step and performing a computation process of the next three points in accordance with said computation relation of said set $G'_i$, and selecting a computation relation of a set $G'_i$ of the next three points based on a set $G'_{i+1}$ of the three computed points and repeatedly performing a computation process of the next three points according to the number of bits of k or l of said binary representation data in accordance with said computation relation of said set $G'_i$, in which when the high-order bit values of the high orders t to i when each bit of said binary representation data of k and l is k: $(k_t \ldots k_o)_2$ and l: $(l_t \ldots l_o)_2$ are $m_i=(k_t \ldots k_i)_2$ and $n_i=(l_t \ldots l_i)_2$, said set $G'_i$ of three points is formed of the three points which are selected on the basis of a combination of the bit values $(k_{i-1}, l_{i-1})$ of k and l of said binary representation data from the four points indicated in the expressions below by using said point P and said point Q:

$m_i P + n_i Q$ $m_i P + (n_i+1)Q$ $(m_i+1)P + n_i Q$ $(m_i+1)P + (n_i+1)Q$, and said iterative computation process step includes computing said set $G'_i$ of the next three points on the basis of said set $G'_{i+1}$ of the three computed points repeatedly to eventually compute a set $G'_i$ of three points, and in which W=kP+lQ is computed from said set $G'_i$ of three points; and wherein the obtained computed results are usable to encrypt and/or decrypt the data.

* * * * *

UNITED STATES PATENT AND TRADEMARK OFFICE
CERTIFICATE OF CORRECTION

PATENT NO. : 7,177,422 B2 Page 1 of 1
APPLICATION NO. : 10/128805
DATED : February 13, 2007
INVENTOR(S) : Toru Akishita It is certified that error appears in the above-identified patent and that said Letters Patent is hereby corrected as shown below:

In Column 3, Line 30, please insert --$(X_0-Z_0)^2$-- after "$X_2=(X_0+Z_0)^2$";

In Column 10, Line 27, "$X^3$" should read --$x^3$--;

In Column 12, Line 43, "Go" should read --$G_o$--;

In Column 15, Line 8, "$y^2+Xy=X^3$" should read --$y^2+xy=x^3$--;

In Column 40, Line 34, "$(m_i + 1)P - (n_I + 1)Q$" should read --$(m_i + 1)P + (n_i + 1)Q$--

Signed and Sealed this

Twenty-sixth Day of February, 2008

JON W. DUDAS
*Director of the United States Patent and Trademark Office*